(12) United States Patent
Zhang et al.

(10) Patent No.: US 12,388,604 B2
(45) Date of Patent: Aug. 12, 2025

(54) INTER ACCESS NETWORK INTERFERENCE MEASUREMENT AND REPORT CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/858,521

(22) Filed: Jul. 6, 2022

(65) Prior Publication Data

US 2024/0014977 A1 Jan. 11, 2024

(51) Int. Cl.
*H04L 12/26* (2006.01)
*H04L 5/00* (2006.01)
*H04W 24/10* (2009.01)

(52) U.S. Cl.
CPC ........... *H04L 5/0053* (2013.01); *H04W 24/10* (2013.01)

(58) Field of Classification Search
CPC ... H04L 5/0053; H04L 43/50; H04L 12/2697; H04L 43/00; H04W 24/10; H04W 24/08; H04W 88/085; H04Q 11/0478; H04Q 11/04
See application file for complete search history.

(56) References Cited

U.S. PATENT DOCUMENTS 11,196,493 B2 * 12/2021 Hwang .................. H04W 24/10
2013/0343346 A1 * 12/2013 Chen .................... H04W 72/541
370/332
2019/0116524 A1 * 4/2019 Isogawa ................ H04W 28/18
2022/0086672 A1 3/2022 Abedini et al.
2022/0104061 A1 3/2022 Abedini et al.
(Continued)

FOREIGN PATENT DOCUMENTS

WO WO-2021037333 A1 3/2021
WO WO-2022032522 A1 2/2022

OTHER PUBLICATIONS

International Search Report and Written Opinion—PCT/US2023/068196—ISA/EPO—Sep. 4, 2023.

*Primary Examiner* — Phuongchau Ba Nguyen
(74) *Attorney, Agent, or Firm* — Holland & Hart LLP

(57) ABSTRACT

Methods, systems, and devices for wireless communications are described. For example, the described techniques provide for configuring a network entity to transmit reference signals for cross-link interference (CLI) measurements, receive reference signals for CLI measurements, or report CLI measurements. A first network entity may transmit an indication to a second network entity of a configuration for transmitting reference signals for CLI measurements. The first network entity may also transmit an indication to a third network entity of a configuration for monitoring for or receiving the reference signals for CLI measurements, and the first network entity may transmit another indication to the third network entity of a configuration for reporting the CLI measurements. The second network entity may then transmit the reference signals, and the third network entity may receive the reference signals, perform CLI measurements on the reference signals, and report the CLI measurements.

18 Claims, 14 Drawing Sheets

(56) References Cited

U.S. PATENT DOCUMENTS

| | | | |
|---|---|---|---|
| 2022/0182977 A1* | 6/2022 | Miao | H04W 72/51 |
| 2022/0272742 A1* | 8/2022 | Xiang | H04L 5/0064 |
| 2022/0278788 A1* | 9/2022 | Pedersen | H04L 5/005 |
| 2022/0376851 A1* | 11/2022 | Noh | H04L 5/001 |
| 2023/0189315 A1* | 6/2023 | Haustein | H04W 24/02 |
| | | | 370/252 |
| 2023/0403058 A1* | 12/2023 | Khan Beigi | H04L 5/0048 |
| 2023/0403708 A1* | 12/2023 | Lauridsen | H04L 1/0026 |

* cited by examiner

INTER ACCESS NETWORK INTERFERENCE MEASUREMENT AND REPORT CONFIGURATION

FIELD OF TECHNOLOGY

The following relates to wireless communications, including inter access network interference measurement and report configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). In some wireless communications systems, communications at different network entities may interfere. For instance, communications between a first network entity and one or more UEs may interfere with communications between a second network entity and one or more UEs. Interference between network entities may be referred to as inter-network entity cross-link interference. Improved techniques for minimizing inter-network entity cross-link interference may be desirable.

SUMMARY

The described techniques relate to improved methods, systems, devices, and apparatuses that support inter access network interference measurement and report configuration. For example, the described techniques provide for configuring a network entity to transmit reference signals for cross-link interference (CLI) measurements, receive reference signals for CLI measurements, or report CLI measurements. A first network entity may transmit an indication to a second network entity of a configuration for transmitting reference signals for CLI measurements. The first network entity may also transmit an indication to a third network entity of a configuration for monitoring for or receiving the reference signals for CLI measurements, and the first network entity may transmit another indication to the third network entity of a configuration for reporting the CLI measurements or reporting based on the CLI measurements. The second network entity may then transmit the reference signals, and the third network entity may receive the reference signals, perform CLI measurements on the reference signals, and report the CLI measurements or report based on the CLI measurements.

A method for wireless communication at a first network entity is described. The method may include receiving, from a second network entity, an indication of a configuration for transmitting reference signals for interference measurements at a third network entity, transmitting the reference signals based on the configuration, and receiving a scheduling message from the second network entity scheduling communications at the first network entity based on transmitting the reference signals.

An apparatus for wireless communication at a first network entity is described. The apparatus may include a processor, memory coupled with the processor, and instructions stored in the memory. The instructions may be executable by the processor to cause the apparatus to receive, from a second network entity, an indication of a configuration for transmitting reference signals for interference measurements at a third network entity, transmit the reference signals based on the configuration, and receive a scheduling message from the second network entity scheduling communications at the first network entity based on transmitting the reference signals.

Another apparatus for wireless communication at a first network entity is described. The apparatus may include means for receiving, from a second network entity, an indication of a configuration for transmitting reference signals for interference measurements at a third network entity, means for transmitting the reference signals based on the configuration, and means for receiving a scheduling message from the second network entity scheduling communications at the first network entity based on transmitting the reference signals.

A non-transitory computer-readable medium storing code for wireless communication at a first network entity is described. The code may include instructions executable by a processor to receive, from a second network entity, an indication of a configuration for transmitting reference signals for interference measurements at a third network entity, transmit the reference signals based on the configuration, and receive a scheduling message from the second network entity scheduling communications at the first network entity based on transmitting the reference signals.

In some examples of the method, apparatuses, and non-transitory computer-readable medium described herein, the configuration includes a first configuration and the reference signals include a first set of reference signals and the method, apparatuses, and non-transitory computer-readable medium may include further operations, features, means, or instructions for receiving an indication of a second configuration for transmitting a second set of reference signals to one or more user equipment (UEs) for access link management or beam management and transmitting the second set of reference signals to the one or more user equipment (UE)s based on the second configuration, where the second set of reference signals may be different from the first set of reference signals.

In some examples of the method, apparatuses, and non-transitory computer-readable medium described herein, the first set of reference signals partially overlaps with the second set of reference signals. In some examples of the method, apparatuses, and non-transitory computer-readable medium described herein, receiving the indication of the configuration may include operations, features, means, or instructions for receiving a quasi co-location indication of one or more beams for the first network entity to use to transmit the reference signals. In some examples of the method, apparatuses, and non-transitory computer-readable medium described herein, receiving the indication of the configuration may include operations, features, means, or instructions for receiving an indication of a resource mapped to each beam of the one or more beams and transmitting the reference signals using each beam of the one or more beams on a respective resource mapped to each beam.

Some examples of the method, apparatuses, and non-transitory computer-readable medium described herein may further include operations, features, means, or instructions for receiving the indication of the configuration includes receiving an identifier of a resource set on which to transmit the reference signals, and transmitting the reference signals includes transmitting the reference signals on the resource set based on receiving the configuration. In some examples of the method, apparatuses, and non-transitory computer-readable medium described herein, the configuration includes an indication of a type of the resource set, the type of the resource set being periodic, aperiodic, or semi-persistent.

Some examples of the method, apparatuses, and non-transitory computer-readable medium described herein may further include operations, features, means, or instructions for receiving the indication of the configuration includes receiving an indication of a start position, a number of symbols, a repetition factor, or a combination thereof, of the resource set. In some examples of the method, apparatuses, and non-transitory computer-readable medium described herein, the first network entity includes a first distributed unit, the second network entity includes a central unit or an operations, administration, and management entity, and the third network entity includes a second distributed unit.

A method for wireless communication at a first network entity is described. The method may include receiving, from a second network entity, an indication of a configuration for monitoring for reference signals from a third network entity for interference measurements at the first network entity, receiving one or more of the reference signals transmitted by the third network entity for the interference measurements, performing the interference measurements on the one or more of the reference signals, and transmitting a report to the second network entity based on performing the interference measurements on the one or more of the reference signals.

An apparatus for wireless communication at a first network entity is described. The apparatus may include a processor, memory coupled with the processor, and instructions stored in the memory. The instructions may be executable by the processor to cause the apparatus to receive, from a second network entity, an indication of a configuration for monitoring for reference signals from a third network entity for interference measurements at the first network entity, receive one or more of the reference signals transmitted by the third network entity for the interference measurements, perform the interference measurements on the one or more of the reference signals, and transmit a report to the second network entity based on performing the interference measurements on the one or more of the reference signals.

Another apparatus for wireless communication at a first network entity is described. The apparatus may include means for receiving, from a second network entity, an indication of a configuration for monitoring for reference signals from a third network entity for interference measurements at the first network entity, means for receiving one or more of the reference signals transmitted by the third network entity for the interference measurements, means for performing the interference measurements on the one or more of the reference signals, and means for transmitting a report to the second network entity based on performing the interference measurements on the one or more of the reference signals.

A non-transitory computer-readable medium storing code for wireless communication at a first network entity is described. The code may include instructions executable by a processor to receive, from a second network entity, an indication of a configuration for monitoring for reference signals from a third network entity for interference measurements at the first network entity, receive one or more of the reference signals transmitted by the third network entity for the interference measurements, perform the interference measurements on the one or more of the reference signals, and transmit a report to the second network entity based on performing the interference measurements on the one or more of the reference signals.

In some examples of the method, apparatuses, and non-transitory computer-readable medium described herein, the configuration for monitoring for reference signals from the third network entity includes a first configuration and the method, apparatuses, and non-transitory computer-readable medium may include further operations, features, means, or instructions for receiving, from the second network entity, an indication of a second configuration for transmitting the report to the second network entity. In some examples of the method, apparatuses, and non-transitory computer-readable medium described herein, the second configuration for transmitting the report to the second network entity indicates a type of the report, the type of the report being periodic, aperiodic, or semi-persistent.

Some examples of the method, apparatuses, and non-transitory computer-readable medium described herein may further include operations, features, means, or instructions for receiving the second configuration includes receiving an indicator of one or more events to trigger transmission of the report to the second network entity. Some examples of the method, apparatuses, and non-transitory computer-readable medium described herein may further include operations, features, means, or instructions for receiving, from the second network entity, a trigger to perform the interference measurements and transmit the report to the second network entity.

Some examples of the method, apparatuses, and non-transitory computer-readable medium described herein may further include operations, features, means, or instructions for receiving, from the third network entity, a medium access control (MAC) control element triggering the first network entity to perform the interference measurements and transmit the report to the second network entity. In some examples of the method, apparatuses, and non-transitory computer-readable medium described herein, receiving the indication of the configuration may include operations, features, means, or instructions for receiving a quasi co-location indication of one or more beams for the first network entity to use to receive the reference signals.

Some examples of the method, apparatuses, and non-transitory computer-readable medium described herein may further include operations, features, means, or instructions for identifying, from the configuration, a resource mapped to each beam of the one or more beams and receiving the reference signals using each beam of the one or more beams on a respective resource mapped to each beam. In some examples of the method, apparatuses, and non-transitory computer-readable medium described herein, performing the interference measurements may include operations, features, means, or instructions for performing reference signal received power measurements on the reference signals received from the third network entity based on receiving the configuration with the format associated with reference signal received power measurements.

In some examples of the method, apparatuses, and non-transitory computer-readable medium described herein, performing the interference measurements may include operations, features, means, or instructions for performing reference signal strength indicator measurements on the reference signals received from the third network entity based on receiving the configuration with the format associated with reference signal strength indicator measurements. Some examples of the method, apparatuses, and non-transitory computer-readable medium described herein may further include operations, features, means, or instructions for receiving the indication of the configuration includes receiving an identifier of a resource set to monitor for the reference signals and receiving the reference signals includes receiving the reference signals on the resource set based on the identifier of the resource set.

In some examples of the method, apparatuses, and non-transitory computer-readable medium described herein, the configuration indicates a type of the resource set, the type of the resource set being periodic, aperiodic, or semi-persistent. In some examples of the method, apparatuses, and non-transitory computer-readable medium described herein, the configuration indicates a start position, a number of symbols, a repetition factor, or a combination thereof of the resource set. In some examples of the method, apparatuses, and non-transitory computer-readable medium described herein, the first network entity includes a first distributed unit, the second network entity includes a central unit or an operations, administration, and management entity, and the third network entity includes a second distributed unit.

A method for wireless communication at a first network entity is described. The method may include transmitting first information associated with a first configuration for transmission of reference signals from a second network entity to a third network entity, transmitting second information associated with a second configuration for monitoring for the reference signals by the third network entity, transmitting third information associated with a third configuration for reporting, by the third network entity, interference measurements performed on the reference signals received from the second network entity, and receiving fourth information associated with the interference measurements reported by the third network entity based on transmitting the first information, the second information, and the third information.

An apparatus for wireless communication at a first network entity is described. The apparatus may include a processor, memory coupled with the processor, and instructions stored in the memory. The instructions may be executable by the processor to cause the apparatus to transmit first information associated with a first configuration for transmission of reference signals from a second network entity to a third network entity, transmit second information associated with a second configuration for monitoring for the reference signals by the third network entity, transmit third information associated with a third configuration for reporting, by the third network entity, interference measurements performed on the reference signals received from the second network entity, and receive fourth information associated with the interference measurements reported by the third network entity based on transmitting the first information, the second information, and the third information.

Another apparatus for wireless communication at a first network entity is described. The apparatus may include means for transmitting first information associated with a first configuration for transmission of reference signals from a second network entity to a third network entity, means for transmitting second information associated with a second configuration for monitoring for the reference signals by the third network entity, means for transmitting third information associated with a third configuration for reporting, by the third network entity, interference measurements performed on the reference signals received from the second network entity, and means for receiving fourth information associated with the interference measurements reported by the third network entity based on transmitting the first information, the second information, and the third information.

A non-transitory computer-readable medium storing code for wireless communication at a first network entity is described. The code may include instructions executable by a processor to transmit first information associated with a first configuration for transmission of reference signals from a second network entity to a third network entity, transmit second information associated with a second configuration for monitoring for the reference signals by the third network entity, transmit third information associated with a third configuration for reporting, by the third network entity, interference measurements performed on the reference signals received from the second network entity, and receive fourth information associated with the interference measurements reported by the third network entity based on transmitting the first information, the second information, and the third information.

In some examples of the method, apparatuses, and non-transitory computer-readable medium described herein, scheduling communications at the second network entity and the third network entity based on receiving the fourth information associated with the interference measurements reported by the third network entity. In some examples of the method, apparatuses, and non-transitory computer-readable medium described herein, transmitting the first information, the second information, and the third information, and receiving the fourth information may include operations, features, means, or instructions for coordinating with a fourth network entity to configure the second network entity to transmit the reference signals, the third network entity to receive the reference signals, and the third network entity to report the interference measurements performed on the reference signals.

Some examples of the method, apparatuses, and non-transitory computer-readable medium described herein may further include operations, features, means, or instructions for coordinating with the fourth network entity to schedule communications at the second network entity and the third network entity based on receiving the fourth information associated with the interference measurements reported by the third network entity. In some examples of the method, apparatuses, and non-transitory computer-readable medium described herein, the first network entity includes a central unit or an operations, administration, and management entity, the second network entity includes a first distributed unit, and the third network entity includes a second distributed unit.

DETAILED DESCRIPTION

In some wireless communications systems, communications at different network entities may interfere. For instance, communications between a first network entity and one or more user equipment (UEs) may interfere with communications between a second network entity and one or more UEs. If a first network entity supports full-duplex communications, downlink communications at the first network entity may interfere with uplink communications at a second network entity. Similarly, if different network entities support time division duplexing (TDD), and a first network entity uses a time resource for downlink communications, while a second network entity uses the same time resource for uplink communications, the downlink communications and the uplink communications may interfere. Interference between network entities may be referred to as inter-network entity cross-link interference (CLI). In some cases, as the number of devices in a wireless communications system increases, the CLI between network entities may also increase and may reduce throughput (e.g., due to failed transmissions) and increase overhead (e.g., due to more retransmissions).

As described herein, a wireless communications system may support efficient techniques for facilitating CLI measurements and using these CLI measurements to make scheduling decisions. For example, the described techniques provide for configuring a network entity to transmit reference signals for cross-link interference (CLI) measurements, receive reference signals for CLI measurements, or report CLI measurements. A first network entity may transmit an indication to a second network entity of a configuration for transmitting reference signals for CLI measurements. The first network entity may also transmit an indication to a third network entity of a configuration for monitoring for or receiving the reference signals for CLI measurements, and the first network entity may transmit another indication to the third network entity of a configuration for reporting the CLI measurements. The second network entity may then transmit the reference signals, and the third network entity may receive the reference signals, perform CLI measurements on the reference signals, and report the CLI measurements.

Aspects of the disclosure are initially described in the context of wireless communications systems. Examples of processes and signaling exchanges that support inter access network interference measurement and report configuration are then described. Aspects of the disclosure are further illustrated by and described with reference to apparatus diagrams, system diagrams, and flowcharts that relate to inter access network interference measurement and report configuration.

Figure 1:
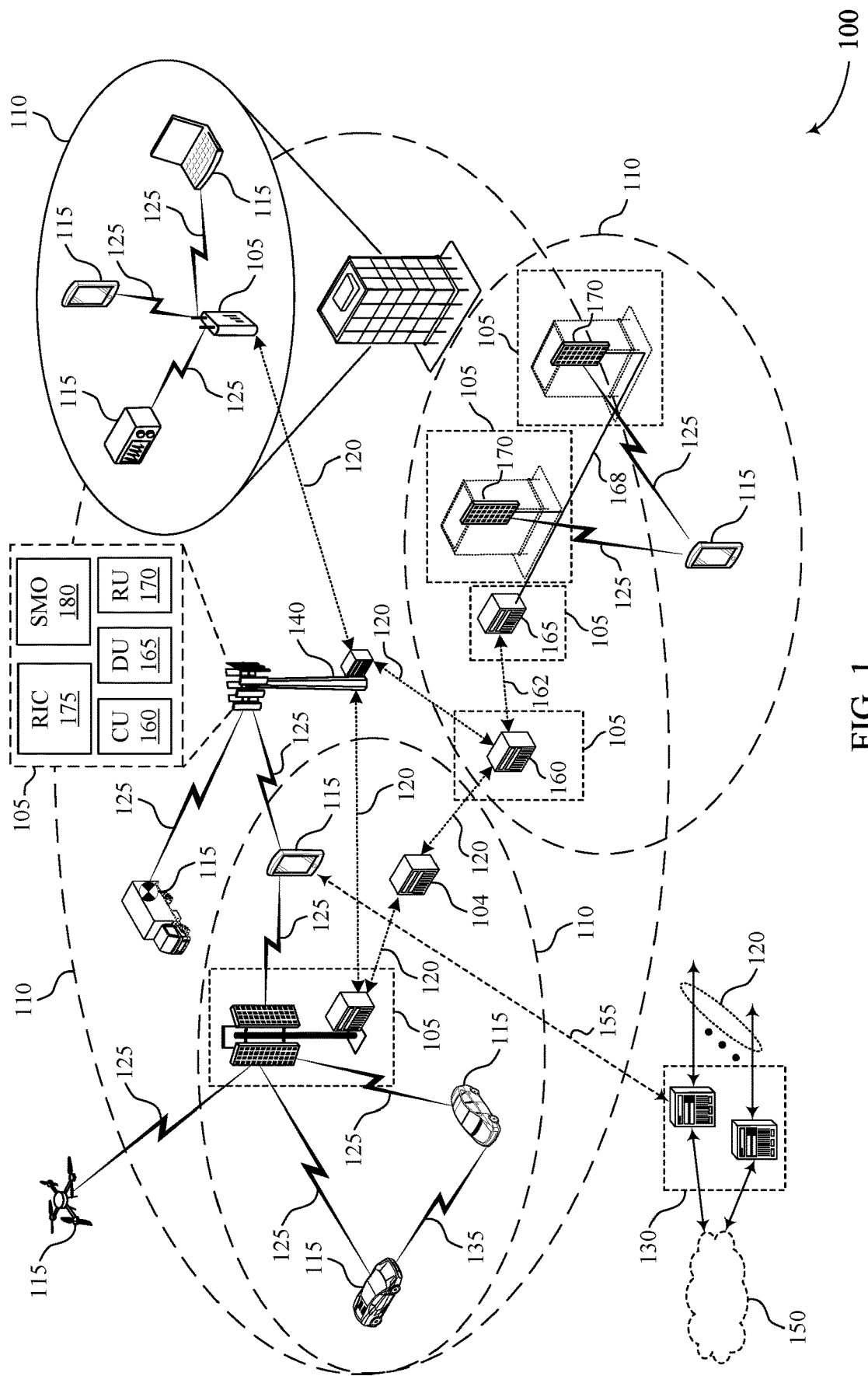
FIG. 1 illustrates an example of a wireless communications system that supports inter access network interference measurement and report configuration in accordance with one or more aspects of the present disclosure.

FIG. 1 illustrates an example of a wireless communications system 100 that supports inter access network interference measurement and report configuration in accordance with one or more aspects of the present disclosure. The wireless communications system 100 may include one or more network entities 105, one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system (e.g., SMO framework), or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support inter access network interference measurement and report configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink control channel (PDCCH) or a physical downlink shared channel (PDSCH)), uplink transmissions (e.g., return link transmissions) from a UE 115 to a network entity 105 (e.g., in a physical uplink control channel (PUCCH) or a physical uplink shared channel (PUSCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support efficient techniques for facilitating CLI measurements and using these CLI measurements to make scheduling decisions to improve throughput. For example, the described techniques provide for configuring a network entity 105 to transmit reference signals for CLI measurements, receive reference signals for CLI measurements, or report CLI measurements. A first network entity 105 may transmit an indication to a second network entity 105 of a configuration for transmitting reference signals for CLI measurements. The first network entity 105 may also transmit an indication to a third network entity 105 of a configuration for monitoring for or receiving the reference signals for CLI measurements, and the first network entity 105 may transmit another indication to the third network entity 105 of a configuration for reporting the CLI measurements. The second network entity 105 may then transmit the reference signals, and the third network entity 105 may receive the reference signals, perform CLI measurements on the reference signals, and report the CLI measurements.

Figure 2:
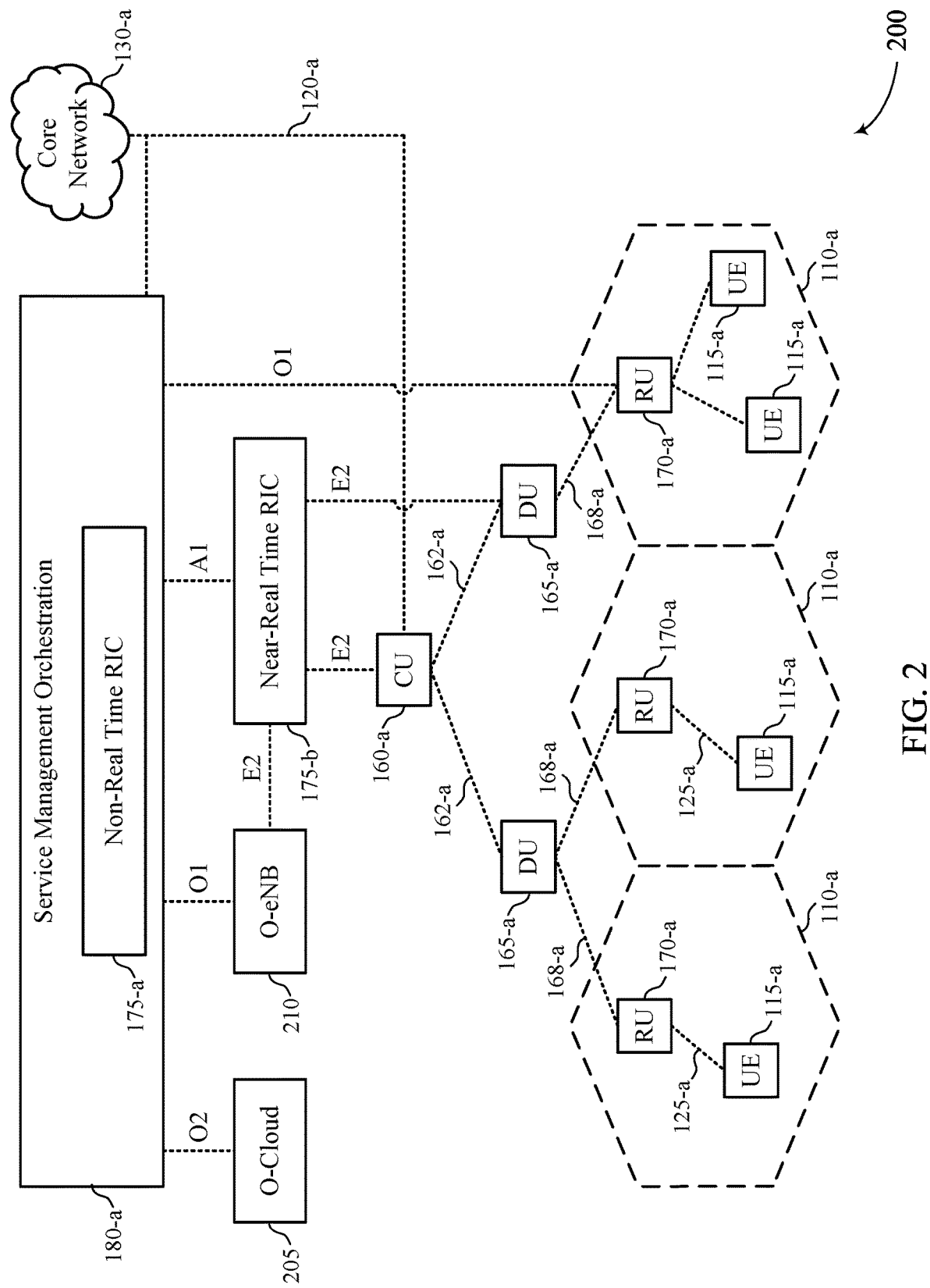
FIG. 2 illustrates an example of a wireless communications system that supports inter access network interference measurement and report configuration in accordance with one or more aspects of the present disclosure.

FIG. 2 illustrates an example of a network architecture 900 (e.g., a disaggregated base station architecture, a disaggregated RAN architecture) that supports inter access network interference measurement and report configuration in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, a Non-RT RIC 175-a associated with an SMO 180-a, or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may communicate with respective UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Some UEs 115 or network entities 105 in wireless communications system 100 and wireless communications system 200 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the network entities 105 or UEs 115 include entering a power saving deep sleep mode when not engaging in active communications, operating over a limited bandwidth (e.g., according to narrowband communications), or a combination of these techniques. For example, some network entities 105 or UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some network entities 105 or UEs 115 may support a full-duplex mode. A full-duplex mode may refer to a mode that supports two-way communication via simultaneous transmission and reception. This two-way communication may be referred to as full-duplex communications. Full-duplex communications is a technique which is capable of theoretically doubling link capacity by enabling radio network nodes to transmit and receive simultaneously on the same frequency and time resource. Full-duplex breaks half-duplex operation constraints where transmission and reception either differ in time or in frequency. A full-duplex network node, such as a network entity 105, UE 115, or both in the cellular network, can communicate simultaneously in uplink and downlink with two half-duplex panels using the same radio resources. For instance, a UE 115 may transmit uplink transmissions from one panel at the UE 115, and the UE 115 may receive downlink transmissions at another panel at the UE 115. Similarly, a network entity 105 may receive uplink transmissions at one panel at the network entity 105, and the network entity 105 may transmit downlink transmissions from another panel at the network entity 105.

Thus, a device equipped with multiple TRPs that supports the capability of simultaneous transmission and reception using the same time-frequency radio resource (e.g., uplink or downlink transmissions in frequency range 2 (FR2) and different associated aspects of procedures) may be referred to as a full-duplex capable device (e.g., full-duplex UE 115 or full-duplex network entity 105). The device may also be capable of working in both the full-duplex mode and backing off to a half-duplex mode. In some cases, a full-duplex capability may be conditional on beam separation and other factors (e.g., self-interference between downlink and uplink and clutter echo at a device). However, full-duplex communications may provide for latency reduction (e.g., since it may be possible to receive a downlink signal in an uplink-only slot, which may enable latency savings), spectrum efficiency enhancement (e.g., per cell or per UE 115), more efficient resource utilization, and coverage enhancements with continuous uplink or downlink transmissions or repetitions.

Figure 3:
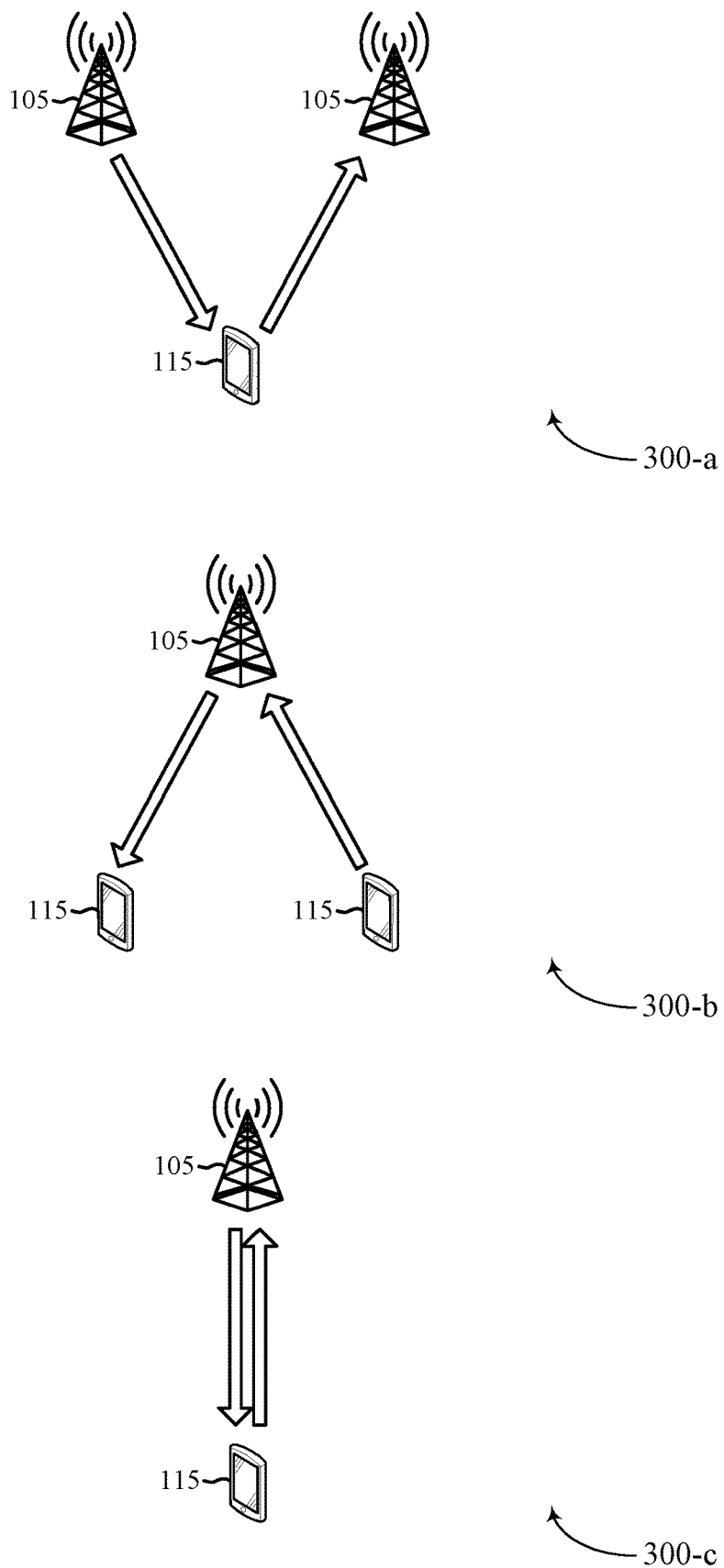
FIG. 3 illustrates examples of full-duplex communications in accordance with one or more aspects of the present disclosure.

FIG. 3 illustrates examples of full-duplex communications 300 in accordance with one or more aspects of the present disclosure. In a first example 300-*a*, a UE 115 may support full-duplex communications (e.g., operate in a full-duplex mode), and the UE 115 may receive downlink signals from a first network entity 105 (e.g., cell or transmission and reception point (TRP)) and transmit uplink signals to a second network entity 105. The first example 300-*a* may be an example of multi-TRP communications for the UE 115 using full-duplex operation. For the first example, 300-*a*, full-duplex operation may be disabled at the network entities. In a second example 300-*b*, a network entity 105 may support full-duplex communications (e.g., operate in a full-duplex mode), and the network entity 105 may transmit downlink signals to a first UE 115 and receive uplink signals from a second UE 115. In the second example 300-*b*, full-duplex operation may be enabled at the network entity 105 and may be disabled at the UEs 115 (e.g., for TAB). In a third example 300-*c*, a network entity 105 and a UE 115 may each support full-duplex communications (e.g., operate in a full-duplex mode). Some communication networks may use combinations of the illustrated examples (e.g., a network entity 105 may support full-duplex to different UEs, where at least one UE supports full-duplex operation with different network entities). The network entity 105 may transmit downlink signals to the UE 115 and receive uplink signals from the UE 115, and the UE 115 may receive downlink signals from the network entity 105 and transmit uplink signals to the network entity 105. In the third example 300-*c*, full-duplex operation may be enabled at the network entity 105 and the UE 115.

Figure 4:
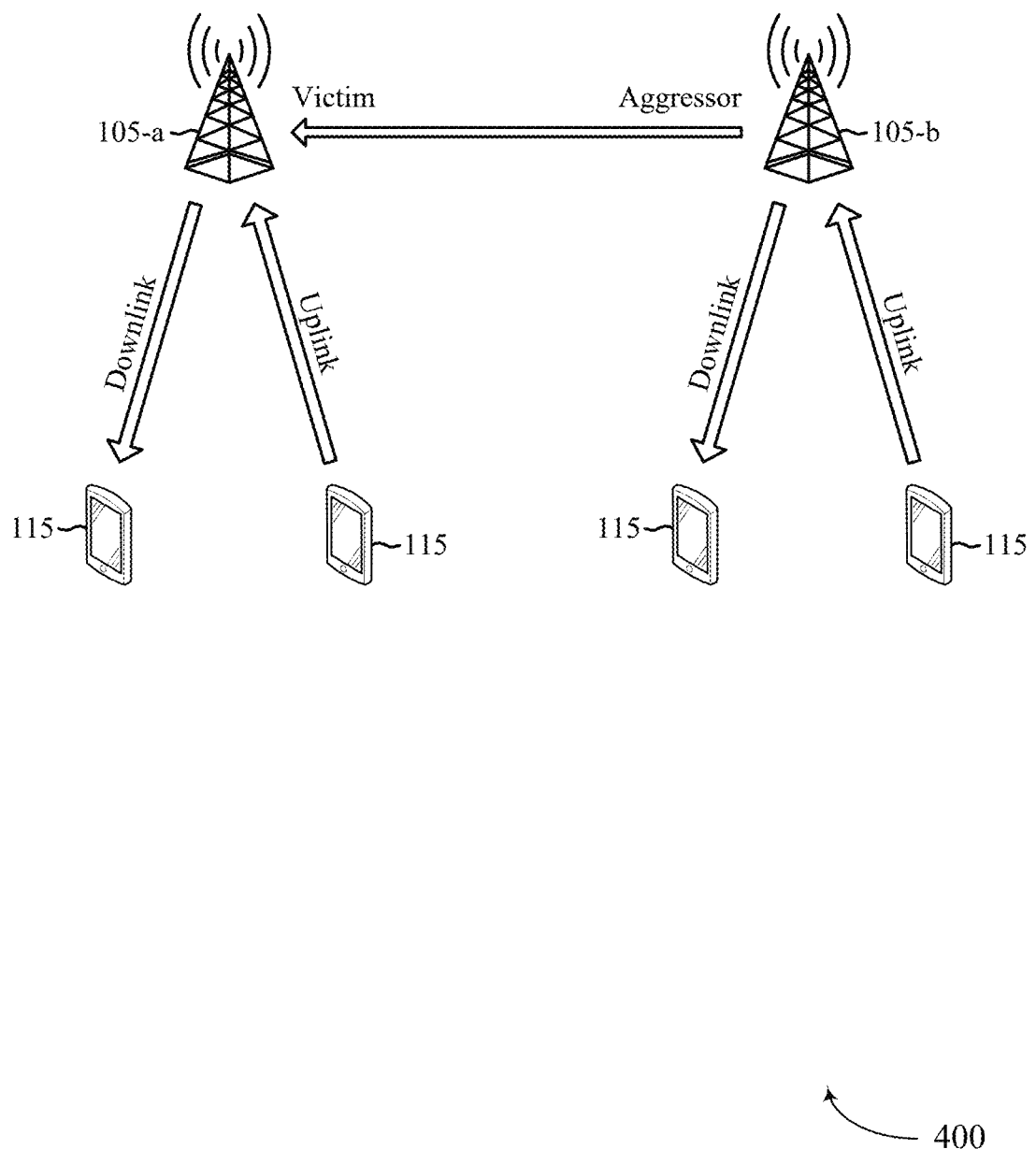
FIG. 4 illustrates an example of cross-link interference (CLI) in accordance with one or more aspects of the present disclosure.

FIG. 4 illustrates an example of CLI 400 in accordance with one or more aspects of the present disclosure. Communications between a network entity 105-*b* and one or more UEs 115 may interfere with communications between a network entity 105-*a* and one or more other UEs 115. The network entity 105-*b* may be referred to as an aggressor, and the network entity 105-*a* may be referred to as a victim.

In some aspects, it may be appropriate for a wireless communications system to support techniques to manage inter-network entity interference or CLI. For instance, if there is strong inter-network entity interference measured by a victim network entity 105, it may be appropriate to support inter-network entity messaging to mitigate the inter-network entity interference. Inter-network entity interference may occur when one or more network entities 105 support full-duplex communications (e.g., where a downlink transmission from the network entity 105-*b* may interfere with an uplink transmission to the network entity 105-*a*). Further, inter-network entity interference may occur when a network entity 105 is operating in a half-duplex mode with flexible or misaligned TDD (e.g., a flexible TDD session). As an example, the inter-network entity interference may occur when the network entity 105-*b* is transmitting a downlink transmission in a same slot or time resource in which the network entity 105-*a* is receiving an uplink transmission.

The techniques described herein provide for supporting signaling for the mitigation of inter-network entity interference. In one aspect, for different time behaviors, it may be appropriate to define configuration signaling (e.g., periodic, semi-persistent, or aperiodic signaling) to configure a transmitting network entity to transmit reference signals (e.g., using a reference signal configuration) and configure a receiving network entity 105 to receive reference signals (e.g., using a reference signal configuration) and report CLI measurements (e.g., using an interference report configuration).

The described signaling configurations for facilitating inter-network entity interference measurements may be used when inter-network entity interference is high or above some threshold. For instance, the signaling configurations may be used when there is interference between network entities 105 supporting full-duplex communications or network entities 105 supporting half-duplex communications (e.g., interference between communications in different directions). Further, the described configurations may be added for CU to CU Xn signaling (e.g., if base stations or DUs are under or served by different CUs) or for base station to CU or DU to CU F1 signaling (e.g., if base stations or DUs are under or served by the same CU). For instance, the described configurations may support inter-network entity messaging and may be signaled between network entities (e.g., DU to CU or CU to CU signaling).

Figure 5:
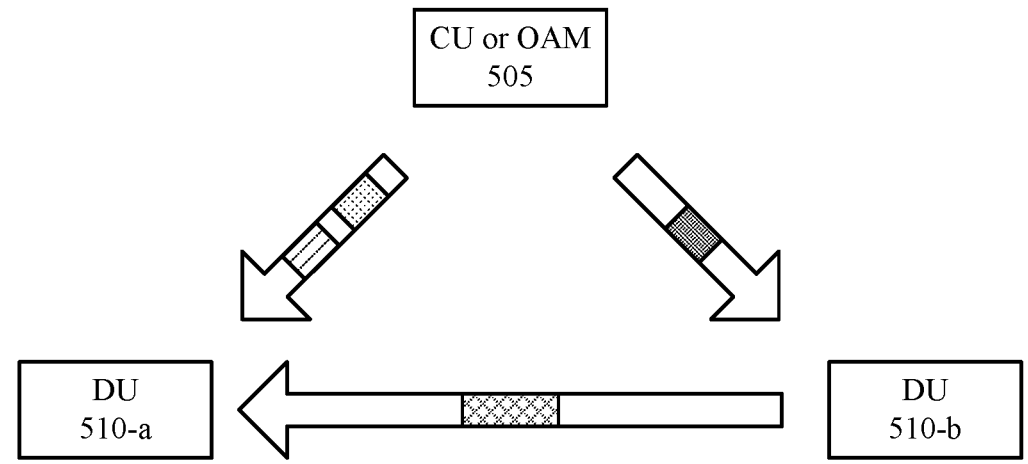
FIG. 5 illustrates an example of a wireless communications system that supports inter access network interference measurement and report configuration in accordance with one or more aspects of the present disclosure.

FIG. 5 illustrates an example of a wireless communications system 500 that supports inter access network interference measurement and report configuration in accordance with one or more aspects of the present disclosure. The wireless communications system 500 includes a CU or organization, administration, and management (OAM) entity 505, which may be an example of a CU, OAM, or network entity 105 described with reference to FIGS. 1-4. The wireless communications system 500 also includes a DU 510-*a* and a DU 510-*b*, which may be examples of DUs or network entities 105 described with reference to FIGS. 1-4. Although the wireless communications system 500 illustrates the DU 510-*a* and the DU 510-*b* being served by (e.g., connected to or configured by) the CU or OAM 505 (e.g., the same CU), the same or similar techniques may be applied if the DU 510-*a* and the DU 510-*b* are served by different CUs or OAMs. The wireless communications system 500 may implement aspects of the wireless communications system 100. For example, the wireless communications system 500 may support efficient techniques for facilitating CLI measurements and using these CLI measurements to make scheduling decisions to improve throughput. Each of the DUs 510 may include or be coupled with one or more RUs. For example, transmissions by a DU 510 may be transmitted by RU functionality included in the DU, or by one or more RUs coupled to the DU 510.

The techniques described herein provide for configuring a network entity 105 to transmit reference signals for CLI measurements, receive reference signals for CLI measurements, or report CLI measurements. A CU or OAM 505 may transmit an indication to a DU 510-*b* of a configuration 515 for transmitting reference signals for CLI measurements. The CU or OAM 505 may also transmit an indication to a DU 510-*a* of a configuration 520 for monitoring for or receiving the reference signals for CLI measurements, and the CU or OAM 505 may transmit another indication to the DU 510-*a* of a configuration 525 for reporting the CLI measurements or reporting based on the CLI measurements. The DU 510-*b* may then transmit the reference signals 530, and the DU 510-*a* may receive the reference signals 530, perform CLI measurements on the reference signals 530, and report the CLI measurements (e.g., to the CU or OAM 505). The reference signals transmitted by the DU 510-*b* may be channel state information (CSI) reference signals (CSI-RSs), synchronization signal blocks (SSBs), or other downlink reference signals.

The configuration 515 may be referred to as an inter-network entity interference measurement configuration (e.g., measurement reference signal resource configuration), an RS-Config information element (IE), or an inter-network entity RS-Config IE. The configuration 515 may be similar to a configuration used to configure sounding reference signal (SRS) transmissions from a UE 115. The configuration 515 may define a list of reference signal resources and a list of reference signal resource sets, and each resource set may define a set of reference signal resources. The CU or OAM 505 may trigger transmission of the set of reference signal resources using a configured aperiodic reference signal resource trigger (e.g., layer 1 (L1) downlink control information (DCI)). The configuration 515 may be different from a configuration for the DU 510-*b* to transmit reference signals to one or more UEs 115 for access link management or beam management. Further, the reference signals 530 transmitted by the DU 510-*b* for inter-network entity interference measurements may partially overlap, fully overlap, or not overlap with reference signals transmitted by the DU 510-*b* for access link management or beam management.

In some examples, the configuration 515 may include multiple fields or other IEs providing information or parameters for the DU 510-*b* to use to transmit the reference signals 530. For instance, the configuration 515 may include (e.g., in an RS-Config field) an RS-ResourceSetToReleaseList field, an RS-ResourceSetToAddModList field, an RS-ResourceToReleaseList field, an RS-ResourceToAddModList field, or a tpc-Accumulation field (e.g., providing transmit power control (TPC) information). The configuration 515 may also include (e.g., in an RS-ResourceSet field) an RS-ResourceSetId field, an RS-ResourceIdList field, or a resourceType field. In some examples, the resourceType may indicate that the DU 510-*b* is to transmit the reference signals 530 on a corresponding resource set aperiodically, and the configuration 515 may further include an aperiodicRS-ResourceTrigger field, a csi-RS/SSB field (e.g., indicating a resource ID of a channel state information (CSI) reference signal (CSI-RS) or synchronization signal block (SSB) corresponding to a beam for the DU 510-*b* to use to transmit the reference signals 530), a slotOffset field, and an aperiodicRS-ResourceTriggerList field. In some examples, the resourceType may indicate that the DU 510-*b* is to transmit the reference signals 530 on a corresponding resource set semi-persistently, and the configuration 515 may further indicate an associatedCSI-RS/SSB. In some examples, the resourceType may indicate that the DU 510-*b* is to transmit the reference signals on a corresponding resource set periodically, and the configuration 515 may further indicate an associatedCSI-RS/SSB.

The configuration 515 may also include (e.g., in an RS-Resource field) an RS-ResourceId, a nrofRS-Ports field (e.g., indicating a number of reference signal ports), a ptrs-PortIndex field, a resourceMapping field (e.g., including a startPosition field, nrofSymbols field, and a repetitionFactor field), a freqDomainPosition field, a freqDomainShift field, a resourceType field, a sequenceId field, and a TCI-State field. Similar to the resourceType field in the RS-ResourceSet field of the configuration 515, the resourceType field in the RS-Resource field may indicate that the DU 510-*b* is to transmit the reference signals 530 on a corresponding resource aperiodically, semi-persistently (e.g., where the configuration 515 may indicate a periodicity and offset), or periodically (e.g., where the configuration 515 may indicate a periodicity and offset).

The configuration 520 may also be referred to as an inter-network entity interference measurement configuration (e.g., measurement reference signal resource configuration), an RS-Config information element (IE), or an inter-network entity RS-Config IE. The CU or OAM 505 may use the configuration 520 to configure the DU 510-*a* to monitor for or receive reference signals from the DU 510-*b*. In some cases, the configuration 520 may be similar to an access link management configuration for the DU 510-*a* to monitor for reference signals (e.g., SRSs) from a UE 115. In such cases, the CU or OAM 505 may add quasi co-location (QCL) information to an access link management configuration to generate the configuration 520. For instance, the CU or OAM 505 may add QCL information indicating one or more beams for the DU 510-*a* to use to receive the reference signals 530 (e.g., add receive QCL information in SRS-resource for CLI for a UE to perform CLI measurements using an indicated receive beam). One or more parameters in the configuration 520 may be used to configure the DU 510-*a* for both L1 and layer 3 (L3) CLI measurements but with separate configured resources.

In some examples, the configuration 520 may include the added QCL information, a receive panel identifier (e.g., identifying a panel for the DU 510-*a* to use to receive the reference signals 530), an RS-ResourceConfigCLI field, an RS-Resource field, an RS-SCS SubcarrierSpacing field, qcl-info SEQUENCE (SIZE(1 . . . maxNrofAP-CSI-RS-ResourcesPerSet)) of TCI-StateId field. Additionally, or alternatively, the configuration 520 may include (e.g., in an RS-ResourceConfigInter-gNBCH field) an rs-ResourceId RS-ResourceId field, an rs-SCS SubcarrierSpacing field, a startPRB INTEGER (0 . . . 2169) field, a nrofPRBs INTEGER (4 . . . maxNrofPhysicalResourceBlocksPlus1) field, a startPosition INTEGER (0 . . . 13) field, a nrofSymbols INTEGER (1 . . . 14) field, an rssi-PeriodicityAndOffset field, an RS-PeriodicityAndOffset field, or a qcl-info SEQUENCE (SIZE(1 . . . maxNrofAP-RS-ResourcesPerSet)) OF TCI-StateId field.

The configuration 525 may also be referred to as an inter-network entity interference report configuration and may be the same as the configuration 520, signaled with the configuration 520, or signaled separately from the configuration 520. The configuration 525 may include periodical, aperiodical, semi-persistent, and eventTriggered fields corresponding to choices of PeriodicalReportConfig, AperiodicalReportConfig, semi-persistentReportConfig, EventTriggerConfig fields, respectively.

In one example, the configuration 525 may configure the DU 510-*a* to report CLI measurements periodically (e.g., or event triggered or based on an event). In this example, the configuration 525 may include an Inter-gNBCH-EventTriggerConfig field which may include an eventId field, a reportInterval field, a reportAmount field, and a maxReportInter-gNBCH field. The eventId field may include an eventI1 field which may include an i1-Threshold field, a reportOnLeave field, a hysteresis field, and a timeToTrigger field. The configuration 525 may also include an Inter-gNBCLI-PeriodicalReportConfig field which may include a reportInterval field, a reportAmount field, a reportQuantity-Inter-gNBCH field, and a maxReportInter-gNBCH field. The configuration 525 may also include a MeasTriggerQuantityInter-gNBCH field which may include an srs-RSRP field and an Inter-gNBCLI-RSSI field. The configuration 525 may also include aMeasReportQuantityInter-gNBCLI field.

In another example, the configuration 525 may configure the DU 510-*a* to report CLI measurements aperiodically. In this example, the configuration 525 may define an inter-gNB-AperiodicTriggerStateList IE. The inter-gNB-AperiodicTriggerStateList IE may include an ASN1START field, a TAG-CSI-APERIODICTRIGGERSTATELIST-START field, an Inter-gNB-AperiodicTriggerStateList field (e.g., defining trigger states linked to one or more report configuration identifiers for inter-network entity measurement reference signal resource sets), an Inter-gNB-AperiodicTriggerState field (e.g., including an associatedReportConfigInfoList field and an AssociatedReportConfigInfo field), and an Inter-gNB-AssociatedReportConfigInfo field (e.g., including a reportConfigId field and an RS-Resource field).

In yet another example, the configuration 525 may configure the DU 510-*a* to report CLI measurements semi-persistently. In this example, the CU or OAM 505 and the DU 510-*a* may support a medium access control (MAC) control element (MAC-CE) for activation or deactivation of semi-persistent inter-network entity CLI reporting on a PUCCH that links to a ReportConfigId for an inter-gNB reference signal resource set. Thus, the wireless communications system 500 may support the activation or deactivation of semi-persistent inter-gNB reporting on PUCCH via over-the-air (OTA) signaling (e.g., a MAC-CE). That is, the wireless communications system 500 may add MAC-CE activation or deactivation of semi-persistent inter-gNB CLI reporting on PUCCH via OTA that links to a ReportConfigId for an inter-gNB reference signal resource set. The CU or OAM 505 may generate the MAC-CE to activate or deactivate the reporting of CLI measurements such that the MAC-CE is identical to a MAC-CE from a UE 115. Additionally, or alternatively, the wireless communications system 500 may define backhaul messaging for inter-gNB semi-persistent CLI measurement activation or deactivation requests. The CU or OAM 505 may then transmit the backhaul messaging to the DU 510-*a* to trigger the DU 510-*a* to report CLI measurements.

Figure 6:
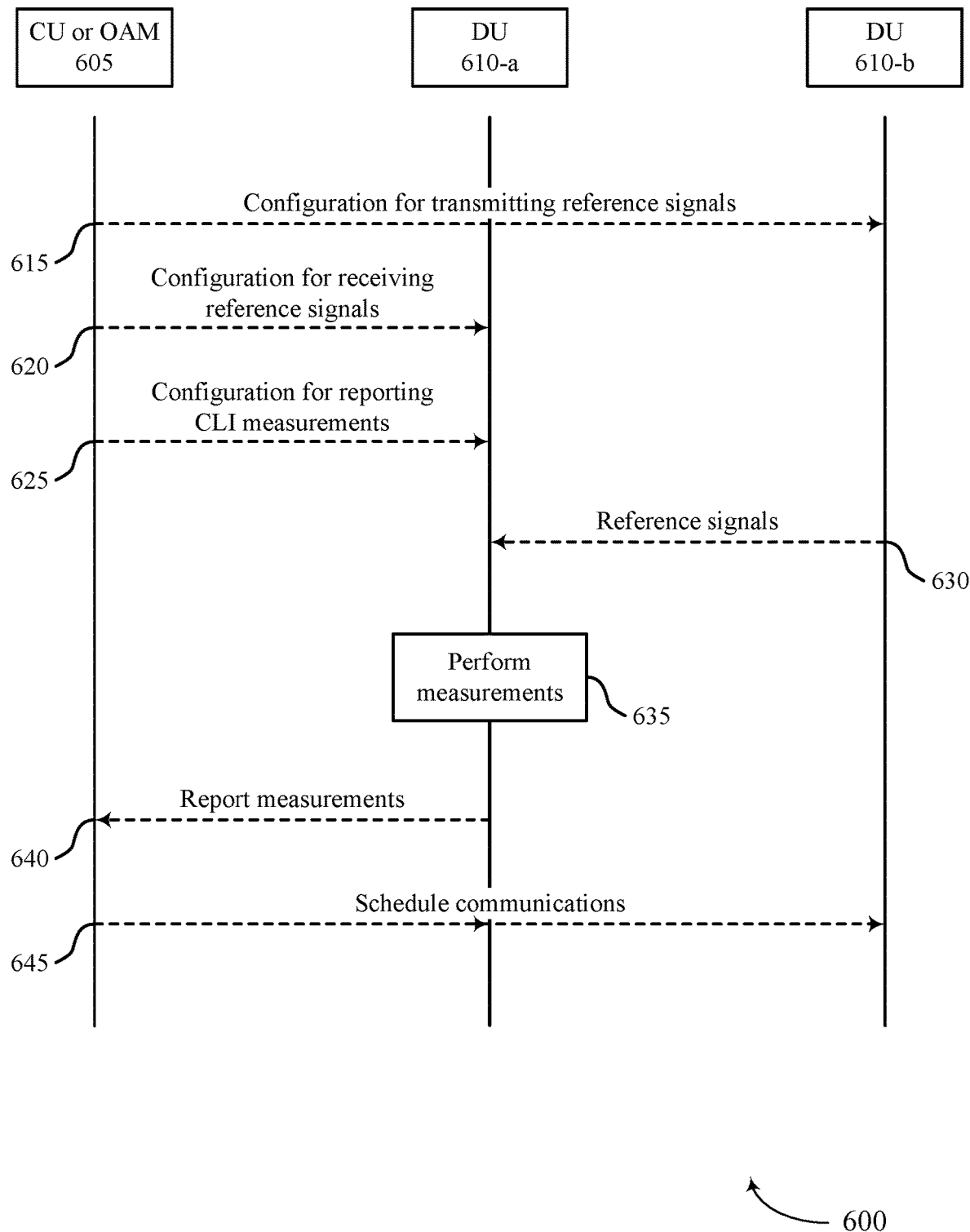
FIG. 6 illustrates an example of a process flow that supports inter access network interference measurement and report configuration in accordance with one or more aspects of the present disclosure.

FIG. 6 illustrates an example of a process flow 600 that supports inter access network interference measurement and report configuration in accordance with one or more aspects of the present disclosure. The process flow 600 includes a CU or OAM 605, which may be an example of a CU or OAM or a network entity described with reference to FIGS. 1-5. The process flow 600 also includes a DU 610-*a* and a DU 610-*b*, which may be examples of DUs or network entities described with reference to FIGS. 1-5. In the example of FIG. 6, the DU 610-*a* and the DU 610-*b* may be served by the CU or OAM 605 (e.g., the same CU). The process flow 600 may implement aspects of the wireless communications system 500. For example, the process flow 600 may support efficient techniques for facilitating CLI measurements and using these CLI measurements to make scheduling decisions to improve throughput.

In the following description of the process flow 600, the signaling exchanged between the CU or OAM 605, the DU 610-*a*, and the DU 610-*b* may be exchanged in a different order than the example order shown, or the operations performed by the CU or OAM 605, the DU 610-*a*, and the DU 610-*b* may be performed in different orders or at different times. Some operations may also be omitted from the process flow 600, and other operations may be added to the process flow 600.

At 615, the CU or OAM 605 may transmit, and the DU 610-*b* may receive, an indication of a configuration for transmitting reference signals for CLI measurements at the DU 610-*a*. The CU or OAM 605 may also transmit, and the DU 610-*b* may receive, an indication of another configuration for transmitting reference signals to one or more UEs 115 for access link management or beam management. The reference signals for access link management or beam management may fully overlap, partially overlap, or not overlap with the reference signals for CLI measurements. Alternatively, the DU 610-*b* may be configured to transmit the reference signals for access link management or beam management, and the DU 610-*a* may be configured to receive the reference signals for access link measurements or beam management, perform CLI measurements on these reference signals, and report the CLI measurements (e.g., to the CU or OAM 605).

At 620, the CU or OAM 605 may transmit, and the DU 610-*a* may receive, an indication of a configuration for monitoring for reference signals from the DU 610-*b* for CLI measurements at the DU 610-*a*. At 625, the CU or OAM 605 may transmit, and the DU 610-*a* may receive, an indication of a configuration for transmitting a report to the CU or OAM 605 (e.g., based on the CLI measurements). The configuration for transmitting the report may be referred to as a report configuration and may indicate a type of the report, the type of the report being periodic, aperiodic, or semi-persistent. In some examples, the DU 610-*a* may receive, in the report configuration, an indicator of one or more events to trigger transmission of a report to the CU or OAM 605. At 630, the DU 610-*b* may transmit, and the DU 610-*a* may receive, reference signals for CLI measurements.

At 635, the DU 610-*a* may perform the CLI measurements on the reference signals received from the DU 610-*b*. At 640, the DU 610-*a* may report to the CU or OAM 605 based on the CLI measurements, and the CU or OAM 605 may receive the CLI measurements from the DU 610-*a*. In some examples, a format of the configuration for monitoring for the reference signals for CLI measurements may be associated with RSRP measurements, and the DU 610-*a* may perform RSRP measurements on the reference signals from the DU 610-*b* based on receiving the configuration with the format associated with RSRP measurements. In some examples, a format of the configuration for monitoring for the reference signals may be associated with RSSI measurements, and the DU 610-*a* may perform RSSI measurements on the reference signals received from the DU 610-*b* based on receiving the configuration with the format associated with RSSI measurements.

In some examples, the CU or OAM 605 may transmit, and the DU 610-*a* may receive, a trigger to receive the reference signals for CLI measurements, perform the CLI measurements, or transmit the report based on the CLI measurements. In some examples, the DU 610-*a* may receive, from the DU 610-*b*, a MAC-CE triggering the DU 610-*a* to receive the reference signals for CLI measurements, perform the CLI measurements, or transmit the report based on the CLI measurements.

In some examples, the CU or OAM 605 may transmit, and the DU 610-*b* may receive, in the configuration for transmitting reference signals for CLI measurements, a QCL indication of one or more beams or beam weights for the DU 610-*b* to use to transmit the reference signals for CLI measurements. Further, the CU or OAM 605 may transmit, and the DU 610-*a* may receive, in the configuration for monitoring for or receiving the reference signals for CLI measurements, a QCL indication of one or more beams for the DU 610-*a* to use to receive the reference signals for CLI measurements. The DU 610-*b* may then transmit the reference signals based on the QCL indication received in the configuration for transmitting the reference signals for CLI measurements, and the DU 610-*a* may receive the reference signals based on the QCL indication received in the configuration for monitoring for or receiving the reference signals for CLI measurements.

In some examples, the CU or OAM 605 may transmit, and the DU 610-*b* may receive, an indication of a resource mapped to each beam of the one or more beams (e.g., a respective resource on which to transmit one or more reference signals for CLI measurements using a respective beam). Further, the DU 610-*a* may identify, from the configuration for receiving the reference signals, a resource mapped to each beam of the one or more beams. For instance, the CU or OAM 605 may transmit, and the DU 610-*a* may receive, an indication of the resource mapped to each beam of the one or more beams. The DU 610-*b* may then transmit the reference signals on a respective resource using each beam (e.g., a beam mapped to the respective resource) of the one or more beams indicated in the configuration for transmitting the reference signals, and the DU 610-*a* may receive the reference signals on the respective resource using each beam of the one or more beams indicated in the configuration for receiving the reference signals.

In some examples, the CU or OAM 605 may transmit, and the DU 610-*b* may receive, an identifier of a resource set on which to transmit the reference signals for CLI measurements. Further, the CU or OAM 605 may transmit, and the DU 610-*a* may receive, in the configuration for monitoring for the reference signals, an identifier of a resource set to monitor for the reference signals. The DU 610-*b* may then transmit, and the DU 610-*a* may receive, the reference signals on the resource set indicated (e.g., by the identifier) in the configuration for transmitting the reference signals and the configuration for receiving the reference signals. In some examples, the configuration for transmitting reference signals for CLI measurements, the configuration for monitoring for the reference signals, or both, may include an indication of a type of the resource set, the type of the resource set being periodic, aperiodic, or semi-persistent. In some examples, the configuration for transmitting reference signals for CLI measurements, the configuration for monitoring for the reference signals, or both may include an indication of a start position, a number of symbols, or a repetition factor, of the resource set.

At 645, the CU or OAM 605 may schedule communications at the DU 610-*a* and the DU 610-*b* based on the CLI measurements. For instance, the CU or OAM 605 may transmit, and the DU 610-*a* may receive, a scheduling message that schedules communications at the DU 610-*a* (e.g., between the DU 610-*a* and one or more UEs 115) based on the CLI measurements. Further, the CU or OAM 605 may transmit, and the DU 610-*b* may receive, a scheduling message that schedules communications at the DU 610-*b* (e.g., between the DU 610-*b* and one or more UEs 115) based on the CLI measurements.

Figure 7:
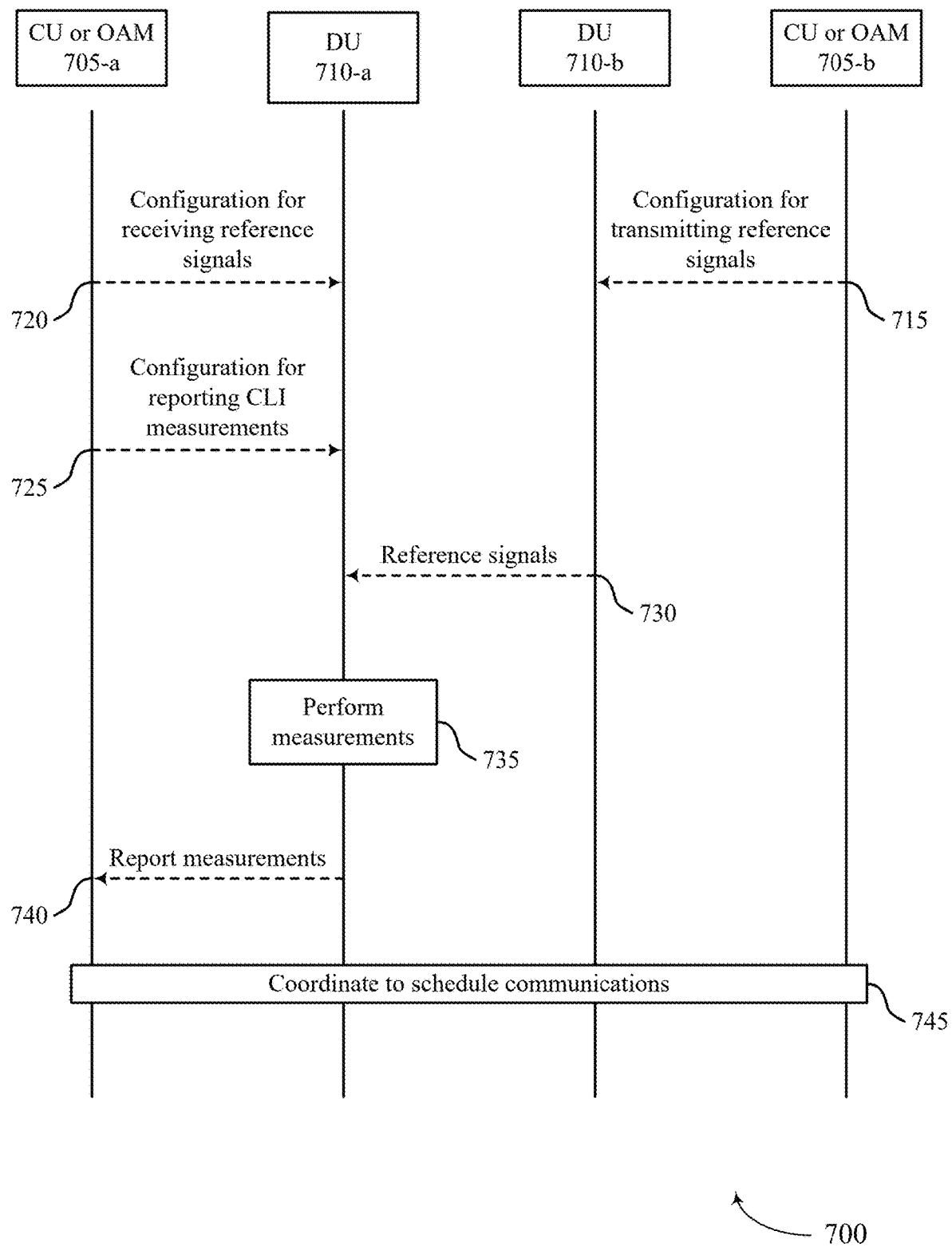
FIG. 7 illustrates an example of a process flow that supports inter access network interference measurement and report configuration in accordance with one or more aspects of the present disclosure.

FIG. 7 illustrates an example of a process flow 700 that supports inter access network interference measurement and report configuration in accordance with one or more aspects of the present disclosure. The process flow 700 includes a CU or OAM 705-*a* and a CU or OAM 705-*b*, which may be examples of CUs, OAMs, or network entities 105 described with reference to FIGS. 1-5. The process flow 700 also includes DU 710-*a* and DU 710-*b*, which may be examples of DUs or network entities 105 described with reference to FIGS. 1-5. In the example of FIG. 7, the DU 710-*a* may be served by the CU or OAM 705-*a*, and the DU 710-*b* may be served by the CU or OAM 705-*b* (e.g., the DU 710-*a* and the DU 710-*b* may be served by different CUs or OAMs). The process flow 700 may implement aspects of the wireless communications system 500. For example, the process flow 700 may support efficient techniques for facilitating CLI measurements and using these CLI measurements to make scheduling decisions to improve throughput.

In the following description of the process flow 700, the signaling exchanged between the CU or OAM 705-*a*, the CU or OAM 705-*b*, the DU 710-*a*, and the DU 710-*b* may be exchanged in a different order than the example order shown, or the operations performed by the CU or OAM 705-*a*, the CU or OAM 705-*b*, the DU 710-*a*, and the DU 710-*b* may be performed in different orders or at different times. Some operations may also be omitted from the process flow 700, and other operations may be added to the process flow 700.

At 715, the CU or OAM 705-*a* may transmit, and the DU 710-*b* may receive, an indication of a configuration for transmitting reference signals for CLI measurements at the DU 710-*a*. The CU or OAM 705-*a* may also transmit, and the DU 710-*b* may receive, an indication of another configuration for transmitting reference signals to one or more UEs 115 for access link management or beam management. The reference signals for access link management or beam management may fully overlap, partially overlap, or not overlap with the reference signals for CLI measurements. Alternatively, the DU 710-*b* may be configured to transmit the reference signals for access link management or beam management, and the DU 710-*a* may be configured to receive the reference signals for access link measurements or beam management, perform CLI measurements on these reference signals, and report the CLI measurements (e.g., to the CU or OAM 705-*a*).

At 720, the CU or OAM 705-*a* may transmit, and the DU 710-*a* may receive, an indication of a configuration for monitoring for reference signals from the DU 710-*b* for CLI measurements at the DU 710-*a*. At 725, the CU or OAM 705-*a* may transmit, and the DU 710-*a* may receive, an indication of a configuration for transmitting a report to the CU or OAM 705-*a* (e.g., based on the CLI measurements). The configuration for transmitting the report may be referred to as a report configuration and may indicate a type of the report, the type of the report being periodic, aperiodic, or semi-persistent. In some examples, the DU 710-*a* may receive, in the report configuration, an indicator of one or more events to trigger transmission of a report to the CU or OAM 705-*a*. At 730, the DU 710-*b* may transmit, and the DU 710-*a* may receive, reference signals for CLI measurements.

At 735, the DU 710-*a* may perform the CLI measurements on the reference signals received from the DU 710-*b*.

At 740, the DU 710-*a* may report to the CU or OAM 705-*a* based on the CLI measurements, and the CU or OAM 705-*a* may receive the CLI measurements from the DU 710-*a*. In some examples, a format of the configuration for monitoring for the reference signals for CLI measurements may be associated with RSRP measurements, and the DU 710-*a* may perform RSRP measurements on the reference signals from the DU 710-*b* based on receiving the configuration with the format associated with RSRP measurements. In some examples, a format of the configuration for monitoring for the reference signals may be associated with RSSI measurements, and the DU 710-*a* may perform RSSI measurements on the reference signals received from the DU 710-*b* based on receiving the configuration with the format associated with RSSI measurements.

In some examples, the CU or OAM 705-*a* may transmit, and the DU 710-*a* may receive, a trigger to receive the reference signals for CLI measurements, perform the CLI measurements, or transmit the report based on the CLI measurements. In some examples, the DU 710-*a* may receive, from the DU 710-*b*, a MAC-CE triggering the DU 710-*a* to receive the reference signals for CLI measurements, perform the CLI measurements, or transmit the report based on the CLI measurements.

In some examples, the CU or OAM 705-*b* may transmit, and the DU 710-*b* may receive, in the configuration for transmitting reference signals for CLI measurements, a QCL indication of one or more beams or beam weights for the DU 710-*b* to use to transmit the reference signals for CLI measurements. Further, the CU or OAM 705-*a* may transmit, and the DU 710-*a* may receive, in the configuration for monitoring for or receiving the reference signals for CLI measurements, a QCL indication of one or more beams for the DU 710-*a* to use to receive the reference signals for CLI measurements. The DU 710-*b* may then transmit the reference signals based on the QCL indication received in the configuration for transmitting the reference signals for CLI measurements, and the DU 710-*a* may receive the reference signals based on the QCL indication received in the configuration for monitoring for or receiving the reference signals for CLI measurements.

In some examples, the CU or OAM 705-*b* may transmit, and the DU 710-*b* may receive, an indication of a resource mapped to each beam of the one or more beams (e.g., a respective resource on which to transmit one or more reference signals for CLI measurements using a respective beam). Further, the DU 710-*a* may identify, from the configuration for receiving the reference signals, a resource mapped to each beam of the one or more beams. For instance, the CU or OAM 705-*a* may transmit, and the DU 710-*a* may receive, an indication of the resource mapped to each beam of the one or more beams. The DU 710-*b* may then transmit the reference signals on a respective resource using each beam (e.g., a beam mapped to the respective resource) of the one or more beams indicated in the configuration for transmitting the reference signals, and the DU 710-*a* may receive the reference signals on the respective resource using each beam of the one or more beams indicated in the configuration for receiving the reference signals.

In some examples, the CU or OAM 705-*b* may transmit, and the DU 710-*b* may receive, an identifier of a resource set on which to transmit the reference signals for CLI measurements. Further, the CU or OAM 705-*a* may transmit, and the DU 710-*a* may receive, in the configuration for monitoring for the reference signals, an identifier of a resource set to monitor for the reference signals. The DU 710-*b* may then transmit, and the DU 710-*a* may receive, the reference signals on the resource set indicated (e.g., by the identifier) in the configuration for transmitting the reference signals and the configuration for receiving the reference signals. In some examples, the configuration for transmitting reference signals for CLI measurements, the configuration for monitoring for the reference signals, or both, may include an indication of a type of the resource set, the type of the resource set being periodic, aperiodic, or semi-persistent. In some examples, the configuration for transmitting reference signals for CLI measurements, the configuration for monitoring for the reference signals, or both may include an indication of a start position, a number of symbols, or a repetition factor, of the resource set.

At 745, the CU or OAM 705-*a* may coordinate with the CU or OAM 705-*b* to schedule communications at the DU 710-*a* and the DU 710-*b* based on the CLI measurements. For instance, the CU or OAM 705-*a* may schedule communications at the DU 710-*a* based on the CLI measurements, and the CU or OAM 705-*a* may transmit the CLI measurements to the CU or OAM 705-*b*. The CU or OAM 705-*b* may then schedule communications at the DU 710-*b* based on the CLI measurements. In addition to coordinating to schedule communications at the DU 710-*a* and the DU 710-*b*, the CU or OAM 705-*a* and the CU or OAM 705-*b* may also coordinate to trigger the DU 710-*b* to transmit the reference signals, trigger the DU 710-*a* to receive the reference signals, or trigger the DU 710-*a* to report the CLI measurements (e.g., or report based on the CLI measurements). For instance, the CU or OAM 705-*a* may transmit information to the CU or OAM 705-*b* to trigger the DU 710-*b* to transmit the reference signals. Additionally, or alternatively, the CU or OAM 705-*b* may transmit information to the CU or OAM 705-*a* to trigger the DU 710-*a* to receive the reference signals, perform CLI measurements on the reference signals, and report the CLI measurements to the CU or OAM 705-*a*.

Figure 8:
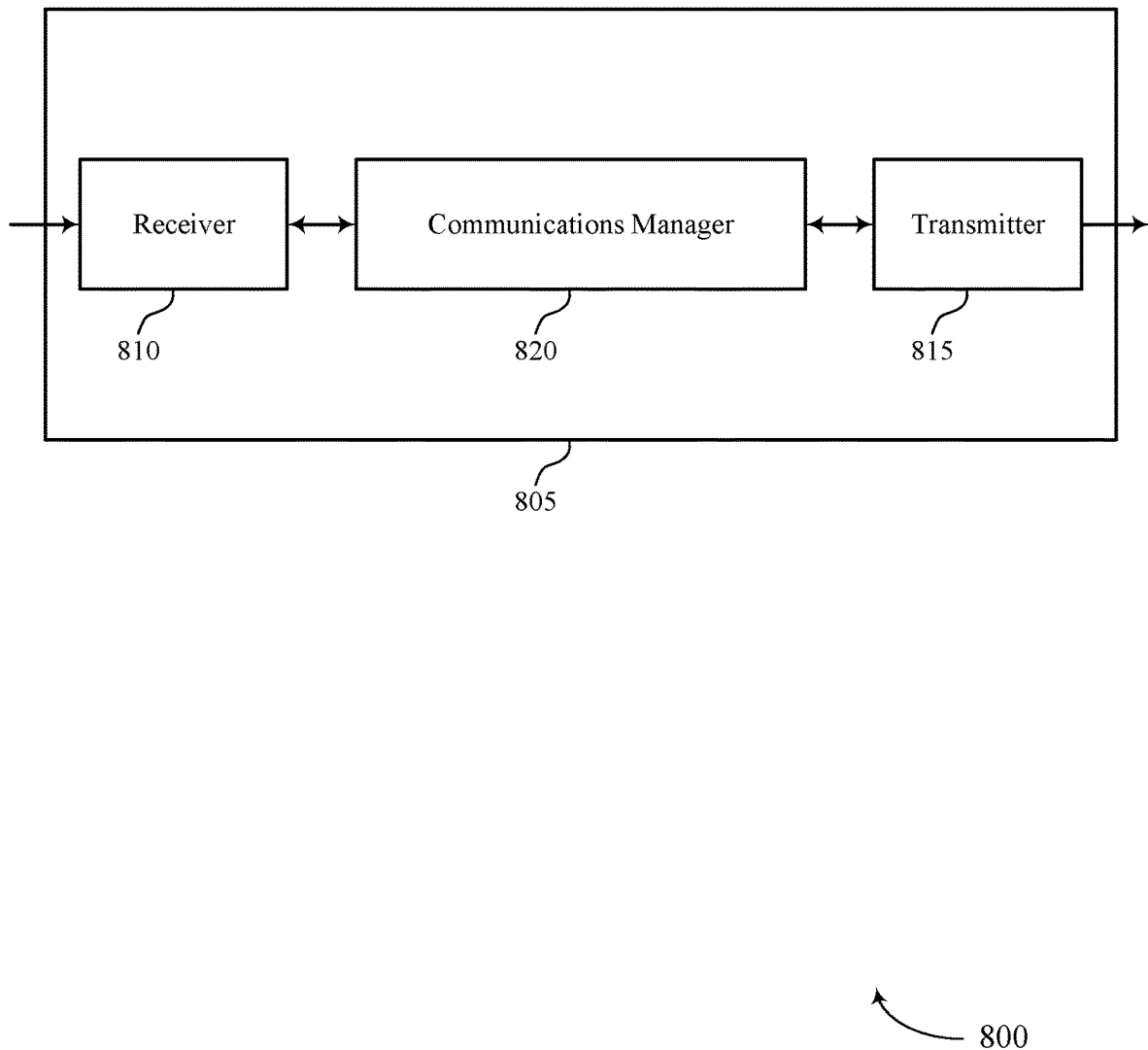
FIGS. 8 and 9 show block diagrams of devices that support inter access network interference measurement and report configuration in accordance with one or more aspects of the present disclosure.

FIG. 8 shows a block diagram 800 of a device 805 that supports inter access network interference measurement and report configuration in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of inter access network interference measurement and report configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network entity in accordance with examples as disclosed herein. For example, the communications manager 820 may be configured as or otherwise support a means for receiving, from a second network entity, an indication of a configuration for transmitting reference signals for interference measurements at a third network entity. The communications manager 820 may be configured as or otherwise support a means for transmitting the reference signals based on the configuration. The communications manager 820 may be configured as or otherwise support a means for receiving a scheduling message from the second network entity scheduling communications at the first network entity based on transmitting the reference signals.

Additionally, or alternatively, the communications manager 820 may support wireless communication at a first network entity in accordance with examples as disclosed herein. For example, the communications manager 820 may be configured as or otherwise support a means for receiving, from a second network entity, an indication of a configuration for monitoring for reference signals from a third network entity for interference measurements at the first network entity. The communications manager 820 may be configured as or otherwise support a means for receiving one or more of the reference signals transmitted by the third network entity for the interference measurements. The communications manager 820 may be configured as or otherwise support a means for performing the interference measurements on the one or more of the reference signals. The communications manager 820 may be configured as or otherwise support a means for transmitting a report to the second network entity based on performing the interference measurements on the one or more of the reference signals.

Additionally, or alternatively, the communications manager 820 may support wireless communication at a first network entity in accordance with examples as disclosed herein. For example, the communications manager 820 may be configured as or otherwise support a means for transmitting first information associated with a first configuration for transmission of reference signals from a second network entity to a third network entity. The communications manager 820 may be configured as or otherwise support a means for transmitting second information associated with a second configuration for monitoring for the reference signals by the third network entity. The communications manager 820 may be configured as or otherwise support a means for transmitting third information associated with a third configuration for reporting, by the third network entity, interference measurements performed on the reference signals received from the second network entity. The communications manager 820 may be configured as or otherwise support a means for receiving fourth information associated with the interference measurements reported by the third network entity based on transmitting the first information, the second information, and the third information.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources. In particular, the device 805 may support techniques for using configuration signaling to facilitate CLI measurements and scheduling based on the CLI measurements. As such, communications at the device 805 or other devices may be scheduled based on CLI measurements to prevent or mitigate CLI, resulting in the reduced processing, reduced power consumption, and the more efficient utilization of communication resources due the reduced CLI.

Figure 9:
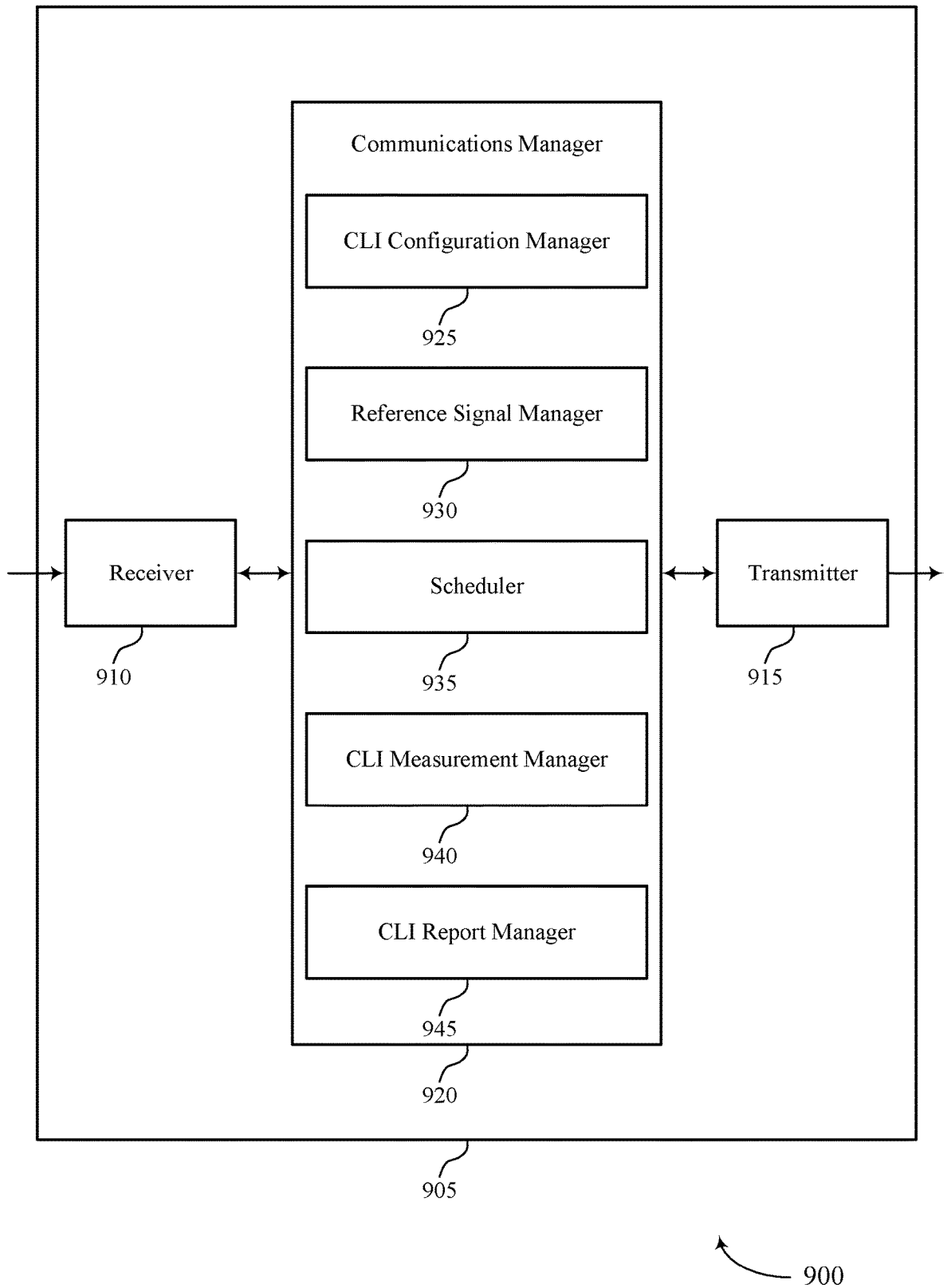

FIG. 9 shows a block diagram 900 of a device 905 that supports inter access network interference measurement and report configuration in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of inter access network interference measurement and report configuration as described herein. For example, the communications manager 920 may include a CLI configuration manager 925, a reference signal manager 930, a scheduler 935, a CLI measurement manager 940, a CLI report manager 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network entity in accordance with examples as disclosed herein. The CLI configuration manager 925 may be configured as or otherwise support a means for receiving, from a second network entity, an indication of a configuration for transmitting reference signals for interference measurements at a third network entity. The reference signal manager 930 may be configured as or otherwise support a means for transmitting the reference signals based on the configuration. The scheduler 935 may be configured as or otherwise support a means for receiving a scheduling message from the second network entity scheduling communications at the first network entity based on transmitting the reference signals.

Additionally, or alternatively, the communications manager 920 may support wireless communication at a first network entity in accordance with examples as disclosed herein. The CLI configuration manager 925 may be configured as or otherwise support a means for receiving, from a second network entity, an indication of a configuration for monitoring for reference signals from a third network entity for interference measurements at the first network entity. The reference signal manager 930 may be configured as or otherwise support a means for receiving one or more of the reference signals transmitted by the third network entity for the interference measurements. The CLI measurement manager 940 may be configured as or otherwise support a means for performing the interference measurements on the one or more of the reference signals. The CLI report manager 945 may be configured as or otherwise support a means for transmitting a report to the second network entity based on performing the interference measurements on the one or more of the reference signals.

Additionally, or alternatively, the communications manager 920 may support wireless communication at a first network entity in accordance with examples as disclosed herein. The CLI configuration manager 925 may be configured as or otherwise support a means for transmitting first information associated with a first configuration for transmission of reference signals from a second network entity to a third network entity. The CLI configuration manager 925 may be configured as or otherwise support a means for transmitting second information associated with a second configuration for monitoring for the reference signals by the third network entity. The CLI configuration manager 925 may be configured as or otherwise support a means for transmitting third information associated with a third configuration for reporting, by the third network entity, interference measurements performed on the reference signals received from the second network entity. The CLI report manager 945 may be configured as or otherwise support a means for receiving fourth information associated with the interference measurements reported by the third network entity based on transmitting the first information, the second information, and the third information.

Figure 10:
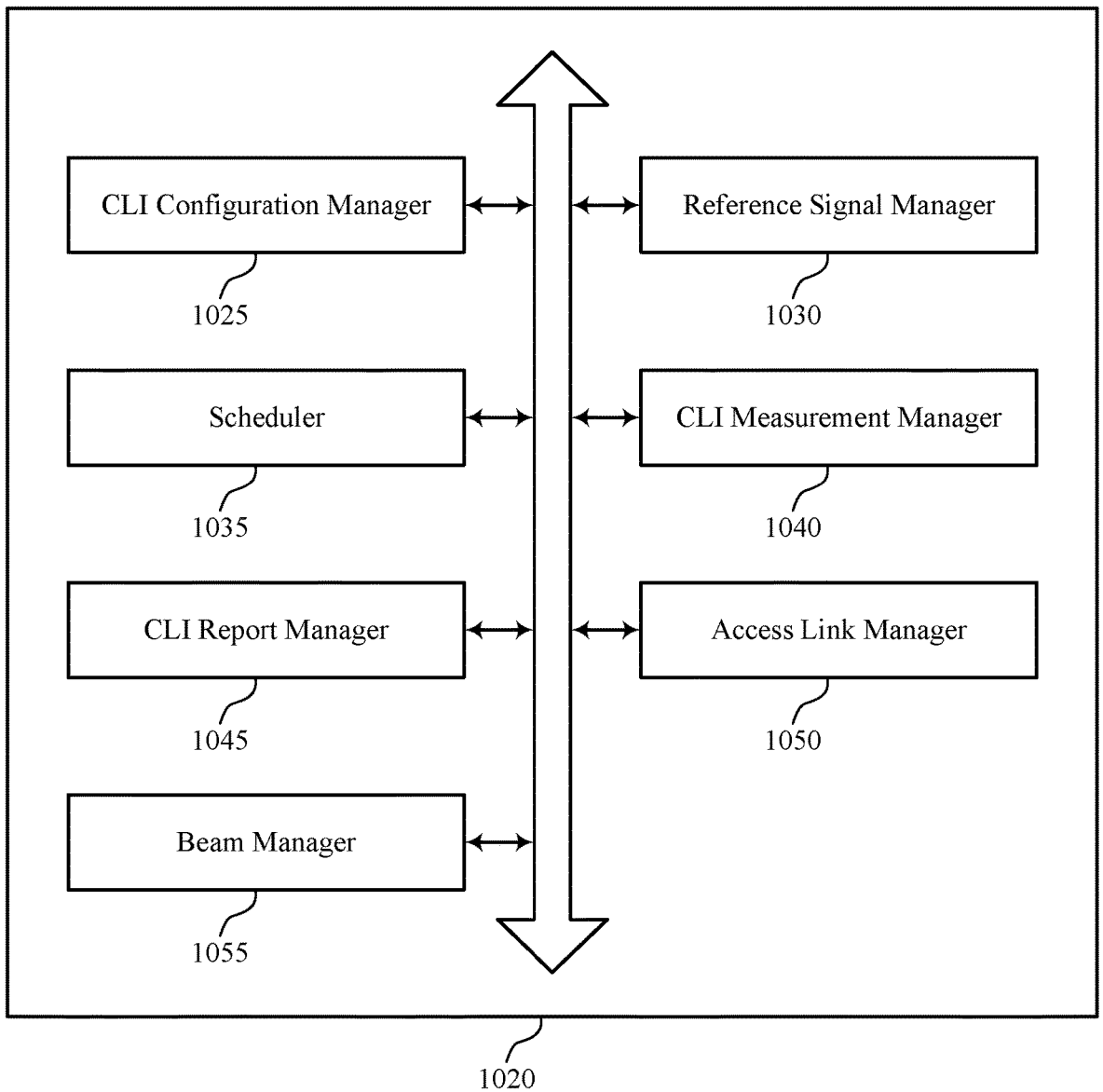
FIG. 10 shows a block diagram of a communications manager that supports inter access network interference measurement and report configuration in accordance with one or more aspects of the present disclosure.

FIG. 10 shows a block diagram 1000 of a communications manager 1020 that supports inter access network interference measurement and report configuration in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of inter access network interference measurement and report configuration as described herein. For example, the communications manager 1020 may include a CLI configuration manager 1025, a reference signal manager 1030, a scheduler 1035, a CLI measurement manager 1040, a CLI report manager 1045, an access link manager 1050, a beam manager 1055, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a first network entity in accordance with examples as disclosed herein. The CLI configuration manager 1025 may be configured as or otherwise support a means for receiving, from a second network entity, an indication of a configuration for transmitting reference signals for interference measurements at a third network entity. The reference signal manager 1030 may be configured as or otherwise support a means for transmitting the reference signals based on the configuration. The scheduler 1035 may be configured as or otherwise support a means for receiving a scheduling message from the second network entity scheduling communications at the first network entity based on transmitting the reference signals.

In some examples, the configuration includes a first configuration and the reference signals include a first set of reference signals, and the access link manager 1050 may be configured as or otherwise support a means for receiving an indication of a second configuration for transmitting a second set of reference signals to one or more user equipment (UEs) for access link management or beam management. In some examples, the configuration includes a first configuration and the reference signals include a first set of reference signals, and the reference signal manager 1030 may be configured as or otherwise support a means for transmitting the second set of reference signals to the one or more UEs based on the second configuration, where the second set of reference signals is different from the first set of reference signals.

In some examples, the first set of reference signals partially overlaps with the second set of reference signals.

In some examples, to support receiving the indication of the configuration, the beam manager 1055 may be configured as or otherwise support a means for receiving a quasi co-location indication of one or more beams for the first network entity to use to transmit the reference signals.

In some examples, to support receiving the indication of the configuration, the beam manager 1055 may be configured as or otherwise support a means for receiving an indication of a resource mapped to each beam of the one or more beams. In some examples, to support receiving the indication of the configuration, the reference signal manager 1030 may be configured as or otherwise support a means for transmitting the reference signals using each beam of the one or more beams on a respective resource mapped to each beam.

In some examples, receiving the indication of the configuration includes receiving an identifier of a resource set on which to transmit the reference signals, and transmitting the reference signals includes transmitting the reference signals on the resource set based on receiving the configuration.

In some examples, the configuration includes an indication of a type of the resource set, the type of the resource set being periodic, aperiodic, or semi-persistent.

In some examples, receiving the indication of the configuration includes receiving an indication of a start position, a number of symbols, a repetition factor, or a combination thereof, of the resource set.

In some examples, the first network entity includes a first distributed unit, the second network entity includes a central unit or an operations, administration, and management entity, and the third network entity includes a second distributed unit.

Additionally, or alternatively, the communications manager 1020 may support wireless communication at a first network entity in accordance with examples as disclosed herein. In some examples, the CLI configuration manager 1025 may be configured as or otherwise support a means for receiving, from a second network entity, an indication of a configuration for monitoring for reference signals from a third network entity for interference measurements at the first network entity. In some examples, the reference signal manager 1030 may be configured as or otherwise support a means for receiving one or more of the reference signals transmitted by the third network entity for the interference measurements. The CLI measurement manager 1040 may be configured as or otherwise support a means for performing the interference measurements on the one or more of the reference signals. The CLI report manager 1045 may be configured as or otherwise support a means for transmitting a report to the second network entity based on performing the interference measurements on the one or more of the reference signals.

In some examples, the configuration for monitoring for reference signals from the third network entity includes a first configuration, and the CLI configuration manager 1025 may be configured as or otherwise support a means for receiving, from the second network entity, an indication of a second configuration for transmitting the report to the second network entity.

In some examples, the second configuration for transmitting the report to the second network entity indicates a type of the report, the type of the report being periodic, aperiodic, or semi-persistent.

In some examples, receiving the second configuration includes receiving an indicator of one or more events to trigger transmission of the report to the second network entity.

In some examples, the CLI measurement manager 1040 may be configured as or otherwise support a means for receiving, from the second network entity, a trigger to perform the interference measurements and transmit the report to the second network entity.

In some examples, the CLI measurement manager 1040 may be configured as or otherwise support a means for receiving, from the third network entity, a medium access control (MAC) control element triggering the first network entity to perform the interference measurements and transmit the report to the second network entity.

In some examples, to support receiving the indication of the configuration, the beam manager 1055 may be configured as or otherwise support a means for receiving a quasi co-location indication of one or more beams for the first network entity to use to receive the reference signals.

In some examples, the beam manager 1055 may be configured as or otherwise support a means for identifying, from the configuration, a resource mapped to each beam of the one or more beams. In some examples, the reference signal manager 1030 may be configured as or otherwise support a means for receiving the reference signals using each beam of the one or more beams on a respective resource mapped to each beam.

In some examples, to support performing the interference measurements, the CLI measurement manager 1040 may be configured as or otherwise support a means for performing reference signal received power measurements on the reference signals received from the third network entity based on receiving the configuration with the format associated with reference signal received power measurements.

In some examples, to support performing the interference measurements, the CLI measurement manager 1040 may be configured as or otherwise support a means for performing reference signal strength indicator measurements on the reference signals received from the third network entity based on receiving the configuration with the format associated with reference signal strength indicator measurements.

In some examples, receiving the indication of the configuration includes receiving an identifier of a resource set to monitor for the reference signals. In some examples, receiving the reference signals includes receiving the reference signals on the resource set based on the identifier of the resource set.

In some examples, the configuration indicates a type of the resource set, the type of the resource set being periodic, aperiodic, or semi-persistent.

In some examples, the configuration indicates a start position, a number of symbols, a repetition factor, or a combination thereof of the resource set.

In some examples, the first network entity includes a first distributed unit, the second network entity includes a central unit or an operations, administration, and management entity, and the third network entity includes a second distributed unit.

Additionally, or alternatively, the communications manager 1020 may support wireless communication at a first network entity in accordance with examples as disclosed herein. In some examples, the CLI configuration manager 1025 may be configured as or otherwise support a means for transmitting first information associated with a first configuration for transmission of reference signals from a second network entity to a third network entity. In some examples, the CLI configuration manager 1025 may be configured as or otherwise support a means for transmitting second information associated with a second configuration for monitoring for the reference signals by the third network entity. In some examples, the CLI configuration manager 1025 may be configured as or otherwise support a means for transmitting third information associated with a third configuration for reporting, by the third network entity, interference measurements performed on the reference signals received from the second network entity. In some examples, the CLI report manager 1045 may be configured as or otherwise support a means for receiving fourth information associated with the interference measurements reported by the third network entity based on transmitting the first information, the second information, and the third information.

In some examples, the scheduler 1035 may be configured as or otherwise support a means for scheduling communications at the second network entity and the third network entity based on receiving the fourth information associated with the interference measurements reported by the third network entity.

In some examples, to support transmitting the first information, the second information, and the third information, and receiving the fourth information, the CLI configuration manager 1025 may be configured as or otherwise support a means for coordinating with a fourth network entity to configure the second network entity to transmit the reference signals, the third network entity to receive the reference signals, and the third network entity to report the interference measurements performed on the reference signals.

In some examples, the scheduler 1035 may be configured as or otherwise support a means for coordinating with the fourth network entity to schedule communications at the second network entity and the third network entity based on receiving the fourth information associated with the interference measurements reported by the third network entity.

In some examples, the first network entity includes a central unit or an operations, administration, and management entity, the second network entity includes a first distributed unit, and the third network entity includes a second distributed unit.

Figure 11:
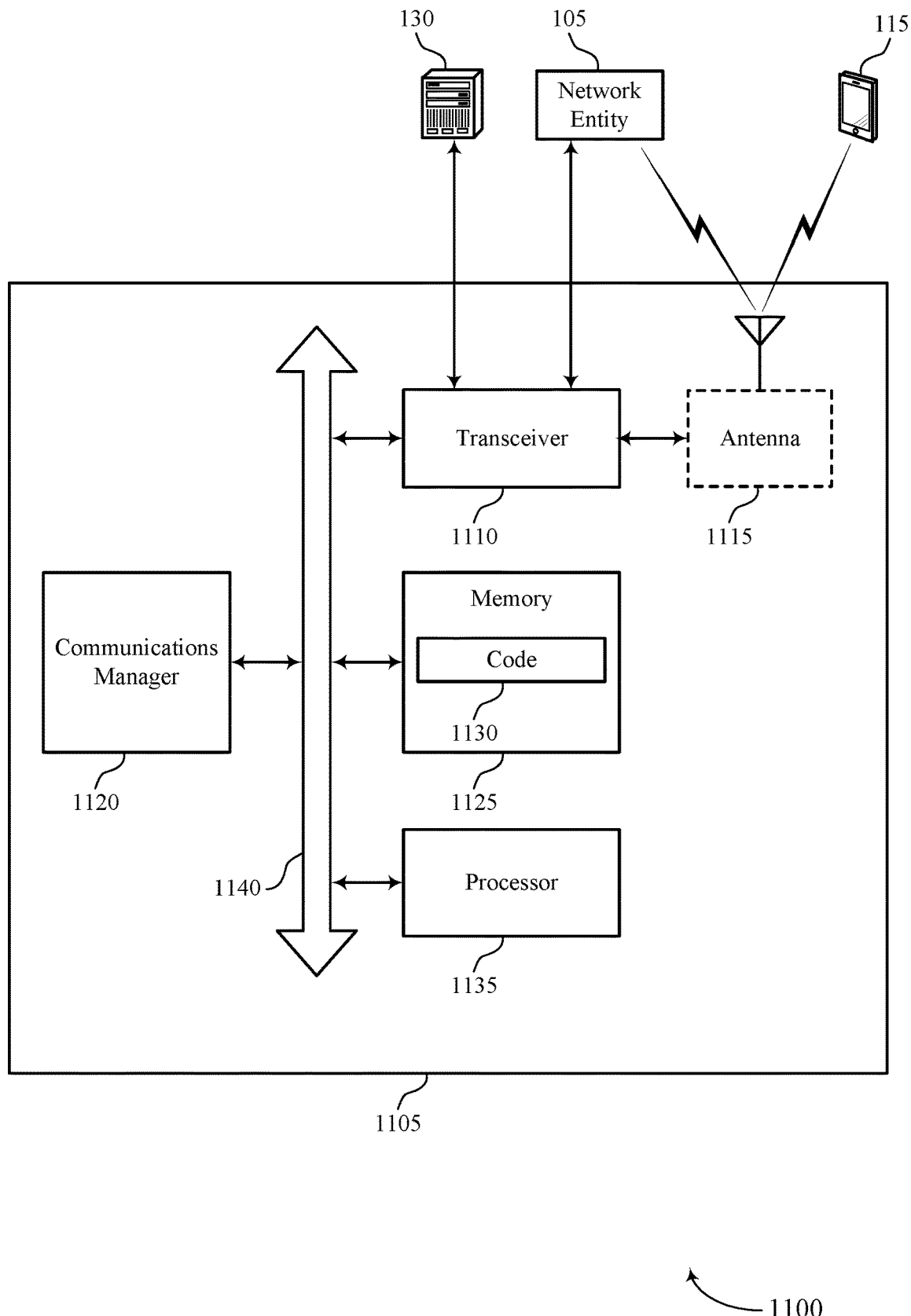
FIG. 11 shows a diagram of a system including a device that supports inter access network interference measurement and report configuration in accordance with one or more aspects of the present disclosure.

FIG. 11 shows a diagram of a system 1100 including a device 1105 that supports inter access network interference measurement and report configuration in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting inter access network interference measurement and report configuration). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a first network entity in accordance with examples as disclosed herein. For example, the communications manager 1120 may be configured as or otherwise support a means for receiving, from a second network entity, an indication of a configuration for transmitting reference signals for interference measurements at a third network entity. The communications manager 1120 may be configured as or otherwise support a means for transmitting the reference signals based on the configuration. The communications manager 1120 may be configured as or otherwise support a means for receiving a scheduling message from the second network entity scheduling communications at the first network entity based on transmitting the reference signals.

Additionally, or alternatively, the communications manager 1120 may support wireless communication at a first network entity in accordance with examples as disclosed herein. For example, the communications manager 1120 may be configured as or otherwise support a means for receiving, from a second network entity, an indication of a configuration for monitoring for reference signals from a third network entity for interference measurements at the first network entity. The communications manager 1120 may be configured as or otherwise support a means for receiving one or more of the reference signals transmitted by the third network entity for the interference measurements. The communications manager 1120 may be configured as or otherwise support a means for performing the interference measurements on the one or more of the reference signals. The communications manager 1120 may be configured as or otherwise support a means for transmitting a report to the second network entity based on performing the interference measurements on the one or more of the reference signals.

Additionally, or alternatively, the communications manager 1120 may support wireless communication at a first network entity in accordance with examples as disclosed herein. For example, the communications manager 1120 may be configured as or otherwise support a means for transmitting first information associated with a first configuration for transmission of reference signals from a second network entity to a third network entity. The communications manager 1120 may be configured as or otherwise support a means for transmitting second information associated with a second configuration for monitoring for the reference signals by the third network entity. The communications manager 1120 may be configured as or otherwise support a means for transmitting third information associated with a third configuration for reporting, by the third network entity, interference measurements performed on the reference signals received from the second network entity. The communications manager 1120 may be configured as or otherwise support a means for receiving fourth information associated with the interference measurements reported by the third network entity based on transmitting the first information, the second information, and the third information.

By including or configuring the communications manager 1120 in accordance with examples as described herein, the device 1105 may support techniques for reduced processing, reduced power consumption, and more efficient utilization of communication resources. In particular, the device 1105 may support techniques for using configuration signaling to facilitate CLI measurements and scheduling based on the CLI measurements. As such, communications at the device 1105 or other devices may be scheduled based on CLI measurements to prevent or mitigate CLI, resulting in the reduced processing, reduced power consumption, and the more efficient utilization of communication resources due the reduced CLI.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of inter access network interference measurement and report configuration as described herein, or the processor 1135 and the memory 1125 may be otherwise configured to perform or support such operations.

Figure 12:
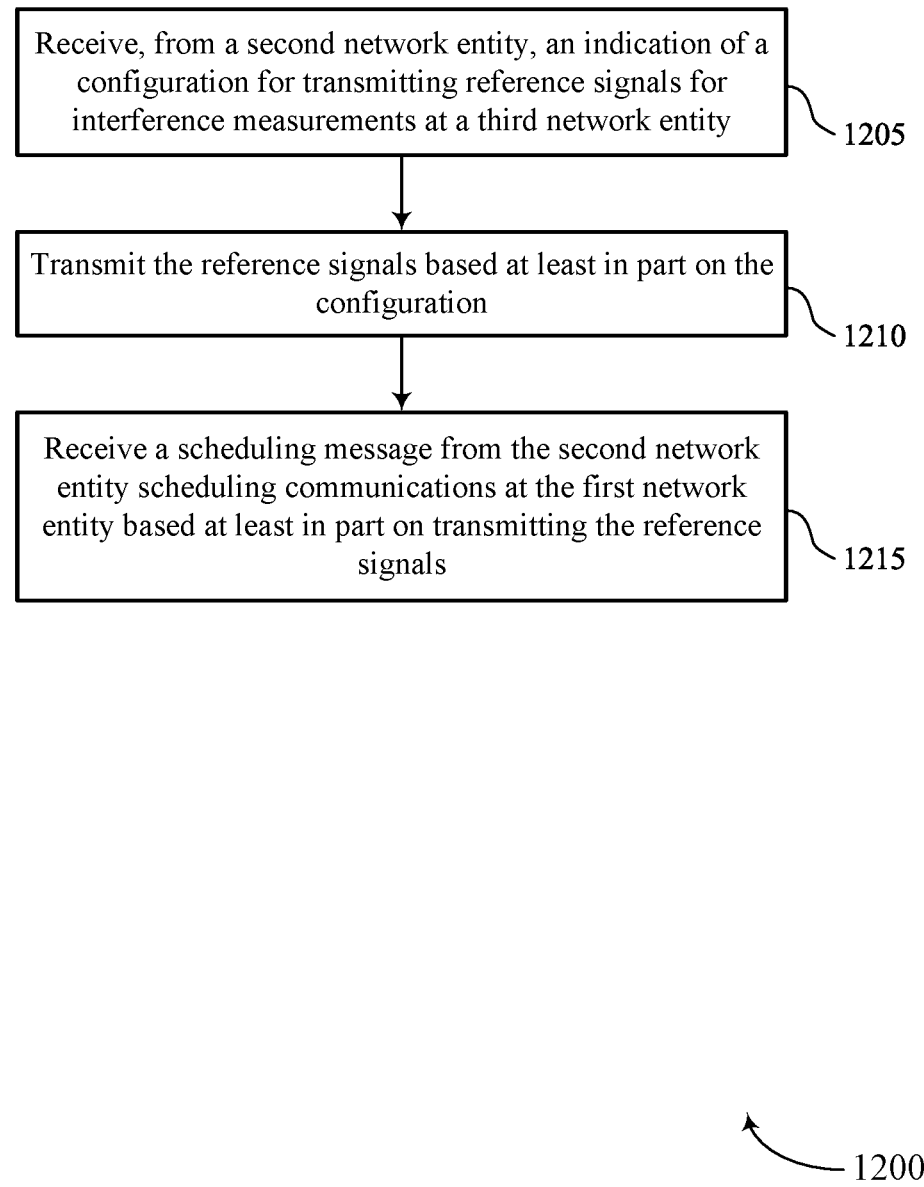
FIGS. 12 through 14 show flowcharts illustrating methods that support inter access network interference measurement and report configuration in accordance with one or more aspects of the present disclosure.

FIG. 12 shows a flowchart illustrating a method 1200 that supports inter access network interference measurement and report configuration in accordance with one or more aspects of the present disclosure. The operations of the method 1200 may be implemented by a network entity or its components as described herein. For example, the operations of the method 1200 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a second network entity, an indication of a configuration for transmitting reference signals for interference measurements at a third network entity. The operations of 1205 may be performed in accordance with examples as disclosed herein. In some examples, aspects of the operations of 1205 may be performed by a CLI configuration manager 1025 as described with reference to FIG. 10.

At 1210, the method may include transmitting the reference signals based on the configuration. The operations of 1210 may be performed in accordance with examples as disclosed herein. In some examples, aspects of the operations of 1210 may be performed by a reference signal manager 1030 as described with reference to FIG. 10.

At 1215, the method may include receiving a scheduling message from the second network entity scheduling communications at the first network entity based on transmitting the reference signals. The operations of 1215 may be performed in accordance with examples as disclosed herein. In some examples, aspects of the operations of 1215 may be performed by a scheduler 1035 as described with reference to FIG. 10.

Figure 13:
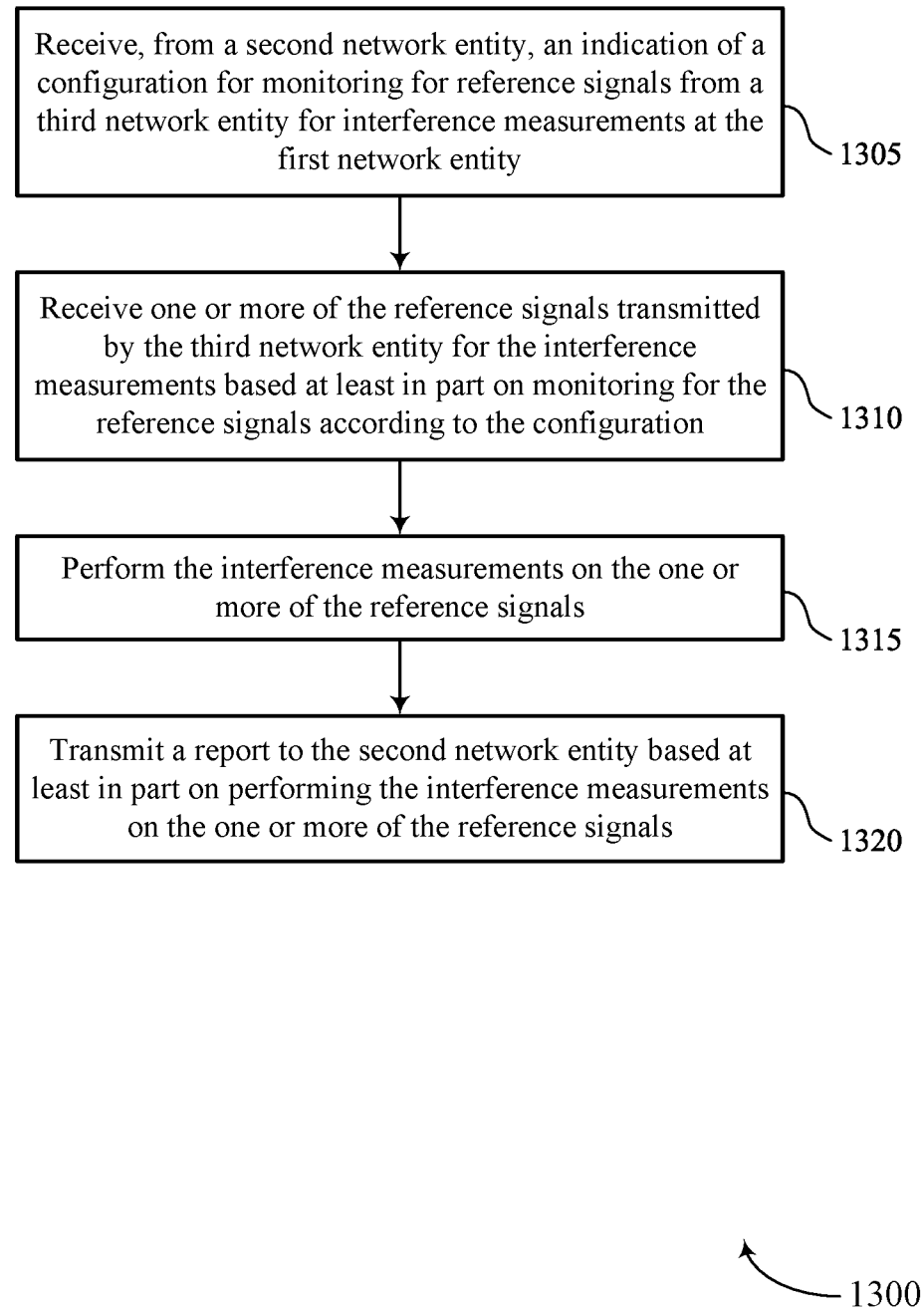

FIG. 13 shows a flowchart illustrating a method 1300 that supports inter access network interference measurement and report configuration in accordance with one or more aspects of the present disclosure. The operations of the method 1300 may be implemented by a network entity or its components as described herein. For example, the operations of the method 1300 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a second network entity, an indication of a configuration for monitoring for reference signals from a third network entity for interference measurements at the first network entity. The operations of 1305 may be performed in accordance with examples as disclosed herein. In some examples, aspects of the operations of 1305 may be performed by a CLI configuration manager 1025 as described with reference to FIG. 10.

At 1310, the method may include receiving one or more of the reference signals transmitted by the third network entity for the interference measurements. The operations of 1310 may be performed in accordance with examples as disclosed herein. In some examples, aspects of the operations of 1310 may be performed by a reference signal manager 1030 as described with reference to FIG. 10.

At 1315, the method may include performing the interference measurements on the one or more of the reference signals. The operations of 1315 may be performed in accordance with examples as disclosed herein. In some examples, aspects of the operations of 1315 may be performed by a CLI measurement manager 1040 as described with reference to FIG. 10.

At 1320, the method may include transmitting a report to the second network entity based on performing the interference measurements on the one or more of the reference signals. The operations of 1320 may be performed in accordance with examples as disclosed herein. In some examples, aspects of the operations of 1320 may be performed by a CLI report manager 1045 as described with reference to FIG. 10.

Figure 14:
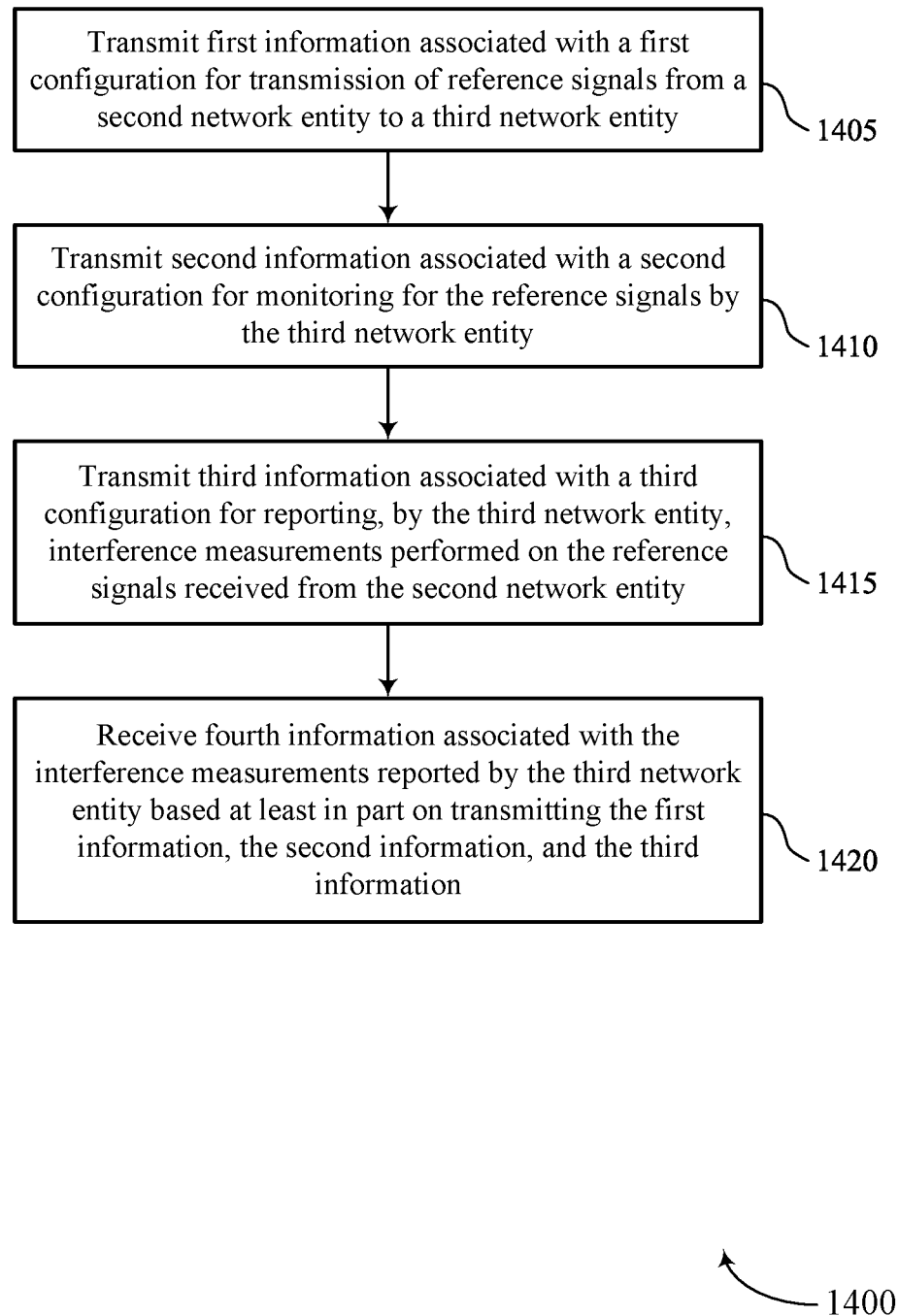

FIG. 14 shows a flowchart illustrating a method 1400 that supports inter access network interference measurement and report configuration in accordance with one or more aspects of the present disclosure. The operations of the method 1400 may be implemented by a network entity or its components as described herein. For example, the operations of the method 1400 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting first information associated with a first configuration for transmission of reference signals from a second network entity to a third network entity. The operations of 1405 may be performed in accordance with examples as disclosed herein. In some examples, aspects of the operations of 1405 may be performed by a CLI configuration manager 1025 as described with reference to FIG. 10.

At 1410, the method may include transmitting second information associated with a second configuration for monitoring for the reference signals by the third network entity. The operations of 1410 may be performed in accordance with examples as disclosed herein. In some examples, aspects of the operations of 1410 may be performed by a CLI configuration manager 1025 as described with reference to FIG. 10.

At 1415, the method may include transmitting third information associated with a third configuration for reporting, by the third network entity, interference measurements performed on the reference signals received from the second network entity. The operations of 1415 may be performed in accordance with examples as disclosed herein. In some examples, aspects of the operations of 1415 may be performed by a CLI configuration manager 1025 as described with reference to FIG. 10.

At 1420, the method may include receiving fourth information associated with the interference measurements reported by the third network entity based on transmitting the first information, the second information, and the third information. The operations of 1420 may be performed in accordance with examples as disclosed herein. In some examples, aspects of the operations of 1420 may be performed by a CLI report manager 1045 as described with reference to FIG. 10.

The following provides an overview of aspects of the present disclosure:

Aspect 1: A method for wireless communication at a first network entity, comprising: receiving, from a second network entity, an indication of a configuration for transmitting reference signals for interference measurements at a third network entity; transmitting the reference signals based at least in part on the configuration; and receiving a scheduling message from the second network entity scheduling communications at the first network entity based at least in part on transmitting the reference signals.

Aspect 2: The method of aspect 1, wherein the configuration comprises a first configuration and the reference signals comprise a first set of reference signals, the method further comprising: receiving an indication of a second configuration for transmitting a second set of reference signals to one or more user equipment (UEs) for access link management or beam management; and transmitting the second set of reference signals to the one or more UEs based at least in part on the second configuration, wherein the second set of reference signals is different from the first set of reference signals.

Aspect 3: The method of aspect 2, wherein the first set of reference signals partially overlaps with the second set of reference signals.

Aspect 4: The method of any of aspects 1 through 3, wherein receiving the indication of the configuration comprises: receiving a quasi co-location indication of one or more beams for the first network entity to use to transmit the reference signals.

Aspect 5: The method of aspect 4, wherein receiving the indication of the configuration comprises: receiving an indication of a resource mapped to each beam of the one or more beams; and transmitting the reference signals using each beam of the one or more beams on a respective resource mapped to each beam.

Aspect 6: The method of any of aspects 1 through 5, wherein receiving the indication of the configuration comprises receiving an identifier of a resource set on which to transmit the reference signals, and transmitting the reference signals comprises transmitting the reference signals on the resource set based at least in part on receiving the configuration.

Aspect 7: The method of aspect 6, wherein the configuration comprises an indication of a type of the resource set, the type of the resource set being periodic, aperiodic, or semi-persistent.

Aspect 8: The method of any of aspects 6 through 7, wherein receiving the indication of the configuration comprises receiving an indication of a start position, a number of symbols, a repetition factor, or a combination thereof, of the resource set.

Aspect 9: The method of any of aspects 1 through 8, wherein the first network entity comprises a first distributed unit, the second network entity comprises a central unit or an operations, administration, and management entity, and the third network entity comprises a second distributed unit.

Aspect 10: A method for wireless communication at a first network entity, comprising: receiving, from a second network entity, an indication of a configuration for monitoring for reference signals from a third network entity for interference measurements at the first network entity; receiving one or more of the reference signals transmitted by the third network entity for the interference measurements; performing the interference measurements on the one or more of the reference signals; and transmitting a report to the second network entity based at least in part on performing the interference measurements on the one or more of the reference signals.

Aspect 11: The method of aspect 10, wherein the configuration for monitoring for reference signals from the third network entity comprises a first configuration, the method further comprising: receiving, from the second network entity, an indication of a second configuration for transmitting the report to the second network entity.

Aspect 12: The method of aspect 11, wherein the second configuration for transmitting the report to the second network entity indicates a type of the report, the type of the report being periodic, aperiodic, or semi-persistent.

Aspect 13: The method of any of aspects 11 through 12, wherein receiving the second configuration comprises receiving an indicator of one or more events to trigger transmission of the report to the second network entity.

Aspect 14: The method of any of aspects 10 through 13, further comprising: receiving, from the second network entity, a trigger to perform the interference measurements and transmit the report to the second network entity.

Aspect 15: The method of any of aspects 10 through 14, further comprising: receiving, from the third network entity, a medium access control (MAC) control element triggering the first network entity to perform the interference measurements and transmit the report to the second network entity.

Aspect 16: The method of any of aspects 10 through 15, wherein receiving the indication of the configuration comprises: receiving a quasi co-location indication of one or more beams for the first network entity to use to receive the reference signals.

Aspect 17: The method of aspect 16, further comprising: identifying, from the configuration, a resource mapped to each beam of the one or more beams; and receiving the reference signals using each beam of the one or more beams on a respective resource mapped to each beam.

Aspect 18: The method of any of aspects 10 through 17, wherein a format of the configuration for monitoring for the reference signals is associated with reference signal received power measurements, and wherein performing the interference measurements comprises: performing reference signal received power measurements on the reference signals received from the third network entity based at least in part on receiving the configuration with the format associated with reference signal received power measurements.

Aspect 19: The method of any of aspects 10 through 18, wherein a format of the configuration for monitoring for the reference signals is associated with reference signal strength indicator measurements, and wherein performing the interference measurements comprises: performing reference signal strength indicator measurements on the reference signals received from the third network entity based at least in part on receiving the configuration with the format associated with reference signal strength indicator measurements.

Aspect 20: The method of any of aspects 10 through 19, wherein. receiving the indication of the configuration comprises receiving an identifier of a resource set to monitor for the reference signals; and receiving the reference signals comprises receiving the reference signals on the resource set based at least in part on the identifier of the resource set Aspect 21: The method of aspect 20, wherein the configuration indicates a type of the resource set, the type of the resource set being periodic, aperiodic, or semi-persistent.

Aspect 22: The method of any of aspects 20 through 21, wherein the configuration indicates a start position, a number of symbols, a repetition factor, or a combination thereof of the resource set.

Aspect 23: The method of any of aspects 10 through 22, wherein the first network entity comprises a first distributed unit, the second network entity comprises a central unit or an operations, administration, and management entity, and the third network entity comprises a second distributed unit.

Aspect 24: A method for wireless communication at a first network entity, comprising: transmitting first information associated with a first configuration for transmission of reference signals from a second network entity to a third network entity; transmitting second information associated with a second configuration for monitoring for the reference signals by the third network entity; transmitting third information associated with a third configuration for reporting, by the third network entity, interference measurements performed on the reference signals received from the second network entity; and receiving fourth information associated with the interference measurements reported by the third network entity based at least in part on transmitting the first information, the second information, and the third information.

Aspect 25: The method of aspect 24, further comprising: scheduling communications at the second network entity and the third network entity based at least in part on receiving the fourth information associated with the interference measurements reported by the third network entity.

Aspect 26: The method of any of aspects 24 through 25, wherein transmitting the first information, the second information, and the third information, and receiving the fourth information comprises: coordinating with a fourth network entity to configure the second network entity to transmit the reference signals, the third network entity to receive the reference signals, and the third network entity to report the interference measurements performed on the reference signals.

Aspect 27: The method of aspect 26, further comprising: coordinating with the fourth network entity to schedule communications at the second network entity and the third network entity based at least in part on receiving the fourth information associated with the interference measurements reported by the third network entity.

Aspect 28: The method of any of aspects 24 through 27, wherein the first network entity comprises a central unit or an operations, administration, and management entity, the second network entity comprises a first distributed unit, and the third network entity comprises a second distributed unit.

Aspect 29: An apparatus for wireless communication at a first network entity, comprising a processor; memory coupled with the processor; and instructions stored in the memory and executable by the processor to cause the apparatus to perform a method of any of aspects 1 through 9.

Aspect 30: An apparatus for wireless communication at a first network entity, comprising at least one means for performing a method of any of aspects 1 through 9.

Aspect 31: A non-transitory computer-readable medium storing code for wireless communication at a first network entity, the code comprising instructions executable by a processor to perform a method of any of aspects 1 through 9.

Aspect 32: An apparatus for wireless communication at a first network entity, comprising a processor; memory coupled with the processor; and instructions stored in the memory and executable by the processor to cause the apparatus to perform a method of any of aspects 10 through 23.

Aspect 33: An apparatus for wireless communication at a first network entity, comprising at least one means for performing a method of any of aspects 10 through 23.

Aspect 34: A non-transitory computer-readable medium storing code for wireless communication at a first network entity, the code comprising instructions executable by a processor to perform a method of any of aspects 10 through 23.

Aspect 35: An apparatus for wireless communication at a first network entity, comprising a processor; memory coupled with the processor; and instructions stored in the memory and executable by the processor to cause the apparatus to perform a method of any of aspects 24 through 28.

Aspect 36: An apparatus for wireless communication at a first network entity, comprising at least one means for performing a method of any of aspects 24 through 28.

Aspect 37: A non-transitory computer-readable medium storing code for wireless communication at a first network entity, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
one or more processors;
memory coupled with the one or more processors; and
instructions stored in the memory and individually or collectively executable by the one or more processors to cause the apparatus to:
receive, from a second network entity, an indication of a configuration for transmitting reference signals for interference measurements at a third network entity;
transmit the reference signals based at least in part on the configuration; and
receive a scheduling message from the second network entity scheduling communications at the first network entity based at least in part on transmitting the reference signals.

2. The apparatus of claim 1, wherein the configuration comprises a first configuration and the reference signals comprise a first set of reference signals, and the instructions are further individually or collectively executable by the one or more processors to cause the apparatus to:
receive an indication of a second configuration for transmitting a second set of reference signals to one or more user equipment (UEs) for access link management or beam management; and
transmit the second set of reference signals to the one or more UEs based at least in part on the second configuration, wherein the second set of reference signals is different from the first set of reference signals.

3. The apparatus of claim 2, wherein the first set of reference signals partially overlaps with the second set of reference signals.

4. The apparatus of claim 1, wherein the instructions to receive the indication of the configuration are individually or collectively executable by the one or more processors to cause the apparatus to:
receive a quasi co-location indication of one or more beams for the first network entity to use to transmit the reference signals.

5. The apparatus of claim 4, wherein the instructions to receive the indication of the configuration are individually or collectively executable by the one or more processors to cause the apparatus to:
receive an indication of a resource mapped to each beam of the one or more beams; and
transmit the reference signals using each beam of the one or more beams on a respective resource mapped to each beam.

6. The apparatus of claim 1, wherein receiving the indication of the configuration comprises receiving an identifier of a resource set on which to transmit the reference signals, and transmitting the reference signals comprises transmitting the reference signals on the resource set based at least in part on receiving the configuration.

7. The apparatus of claim 6, wherein the configuration comprises an indication of a type of the resource set, the type of the resource set being periodic, aperiodic, or semi-persistent.

8. The apparatus of claim 6, wherein receiving the indication of the configuration comprises receiving an indication of a start position, a number of symbols, a repetition factor, or a combination thereof, of the resource set.

9. The apparatus of claim 1, wherein the first network entity comprises a first distributed unit, the second network entity comprises a central unit or an operations, administration, and management entity, and the third network entity comprises a second distributed unit.

10. A method for wireless communication at a first network entity, comprising:
receiving, from a second network entity, an indication of a configuration for transmitting reference signals for interference measurements at a third network entity;
transmitting the reference signals based at least in part on the configuration; and
receiving a scheduling message from the second network entity scheduling communications at the first network entity based at least in part on transmitting the reference signals.

11. The method of claim 10, wherein the configuration comprises a first configuration and the reference signals comprise a first set of reference signals, the method further comprising:
receiving an indication of a second configuration for transmitting a second set of reference signals to one or more user equipment (UEs) for access link management or beam management; and
transmitting the second set of reference signals to the one or more UEs based at least in part on the second configuration, wherein the second set of reference signals is different from the first set of reference signals.

12. The method of claim 11, wherein the first set of reference signals partially overlaps with the second set of reference signals.

13. The method of claim 10, wherein receiving the indication of the configuration further comprises:
receiving a quasi co-location indication of one or more beams for the first network entity to use to transmit the reference signals.

14. The method of claim 13, wherein receiving the indication of the configuration further comprises:
receiving an indication of a resource mapped to each beam of the one or more beams; and
transmitting the reference signals using each beam of the one or more beams on a respective resource mapped to each beam.

15. The method of claim 10, wherein receiving the indication of the configuration comprises receiving an identifier of a resource set on which to transmit the reference signals, and transmitting the reference signals comprises transmitting the reference signals on the resource set based at least in part on receiving the configuration.

16. The method of claim 15, wherein the configuration comprises an indication of a type of the resource set, the type of the resource set being periodic, aperiodic, or semi-persistent.

17. The method of claim 15, wherein receiving the indication of the configuration comprises receiving an indication of a start position, a number of symbols, a repetition factor, or a combination thereof, of the resource set.

18. The method of claim 10, wherein the first network entity comprises a first distributed unit, the second network entity comprises a central unit or an operations, administration, and management entity, and the third network entity comprises a second distributed unit.

\* \* \* \* \*